(12) United States Patent
Kinoshita

(10) Patent No.: US 12,323,419 B2
(45) Date of Patent: Jun. 3, 2025

(54) INFORMATION PROCESSING APPARATUS, METHOD, AND COMPUTER READABLE MEDIUM

(71) Applicant: FUJIFILM BUSINESS INNOVATION CORP., Tokyo (JP)

(72) Inventor: Yosuke Kinoshita, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 468 days.

(21) Appl. No.: 17/411,266

(22) Filed: Aug. 25, 2021

(65) Prior Publication Data
US 2022/0232005 A1    Jul. 21, 2022

(30) Foreign Application Priority Data
Jan. 20, 2021  (JP) ................................ 2021-006838

(51) Int. Cl.
*H04L 9/40*        (2022.01)
*H04L 67/01*       (2022.01)
(52) U.S. Cl.
CPC ........ *H04L 63/0861* (2013.01); *H04L 63/102* (2013.01); *H04L 63/20* (2013.01); *H04L 67/01* (2022.05)
(58) Field of Classification Search
CPC ... H04L 63/0861; H04L 63/102; H04L 63/20; H04L 67/01; H04L 2463/082;
(Continued)

(56) References Cited

U.S. PATENT DOCUMENTS 11,539,690 B2 * 12/2022 Nakagawa ............ H04L 9/3236
2001/0044840 A1 * 11/2001 Carleton ............. H04L 41/0663
709/223
(Continued)

FOREIGN PATENT DOCUMENTS

JP         2018-198400 A     12/2018

OTHER PUBLICATIONS

Haoman Feng et al. "FIDO Gets Verified: A Formal Analysis of the Universal Authentication Framework Protocol," 2023, pp. 4291-4310. (Year: 2023).*

(Continued)

*Primary Examiner* — Luu T Pham
*Assistant Examiner* — Canh Le
(74) *Attorney, Agent, or Firm* — Oliff PLC

(57) ABSTRACT

An information processing apparatus, configured to function as a FIDO client, includes: a memory configured to store authentication device information indicating an authentication device usable in FIDO authentication using the information processing apparatus; and a processor configured to acquire the authentication device information from an authentication device information management server to present the authentication device information to an administrator, cause the memory to store the authentication device information indicating an authentication device that is selected by the administrator as being connectable to the information processing apparatus, and, in response to an authentication start request from a user for FIDO authentication, in a case where an authentication device used by the user is not included in the authentication device indicated by the authentication device information stored in the memory, restrict use of an authentication device used by the user.

9 Claims, 36 Drawing Sheets

(58) Field of Classification Search
CPC ... H04L 9/3231; H04L 9/3271; H04L 9/3247; G06F 21/32; H04N 1/32101
See application file for complete search history.

(56) References Cited

U.S. PATENT DOCUMENTS

| | | | |
|---|---|---|---|
| 2008/0244043 A1* | 10/2008 | Kawai | H04L 41/0856 709/221 |
| 2011/0007365 A1* | 1/2011 | Yukumoto | H04N 1/4413 358/442 |
| 2014/0285668 A1* | 9/2014 | Deweese | H04N 7/188 348/156 |
| 2017/0064118 A1* | 3/2017 | Okayama | H04N 1/00931 |
| 2018/0307955 A1* | 10/2018 | Sakuma | G06F 21/608 |
| 2018/0341759 A1 | 11/2018 | Sato | |
| 2019/0124081 A1* | 4/2019 | Nowak | H04L 63/0892 |
| 2019/0182237 A1 | 6/2019 | Queralt | |
| 2019/0273733 A1* | 9/2019 | Kawabata | H04L 9/32 |
| 2020/0089867 A1* | 3/2020 | Kim | H04L 9/3271 |
| 2020/0313910 A1* | 10/2020 | Lindemann | H04L 9/3247 |
| 2020/0336308 A1* | 10/2020 | Deutschmann | H04L 9/088 |
| 2021/0194919 A1* | 6/2021 | Lindemann | H04L 9/3247 |
| 2022/0005046 A1* | 1/2022 | Kim | G06Q 20/38215 |
| 2022/0035736 A1* | 2/2022 | Chiang | G06F 3/0679 |
| 2022/0239660 A1* | 7/2022 | Shimamoto | H04W 12/06 |
| 2022/0353256 A1* | 11/2022 | Cizer Kobrinsky | H04L 63/102 |

OTHER PUBLICATIONS

Michitomo Morri et al. "Research On Integrated Authentication Using Passwordless Authentication Method," 2017, pp. 682-685. (Year: 2017).*

Feb. 10, 2022 Search Report issued in European Patent Application No. 21195759.2.

Feb. 22, 2022 Office Action issued in European Patent Application No. 21195759.2.

Kim, J. et al., "Design of a Secure Biometric Authentication Framework Using PKI and FIDO in Fintech Environments," International Journal of Security and Its Applications, vol. 10, No. 12, pp. 69-80, 2016.

* cited by examiner

FIG. 9

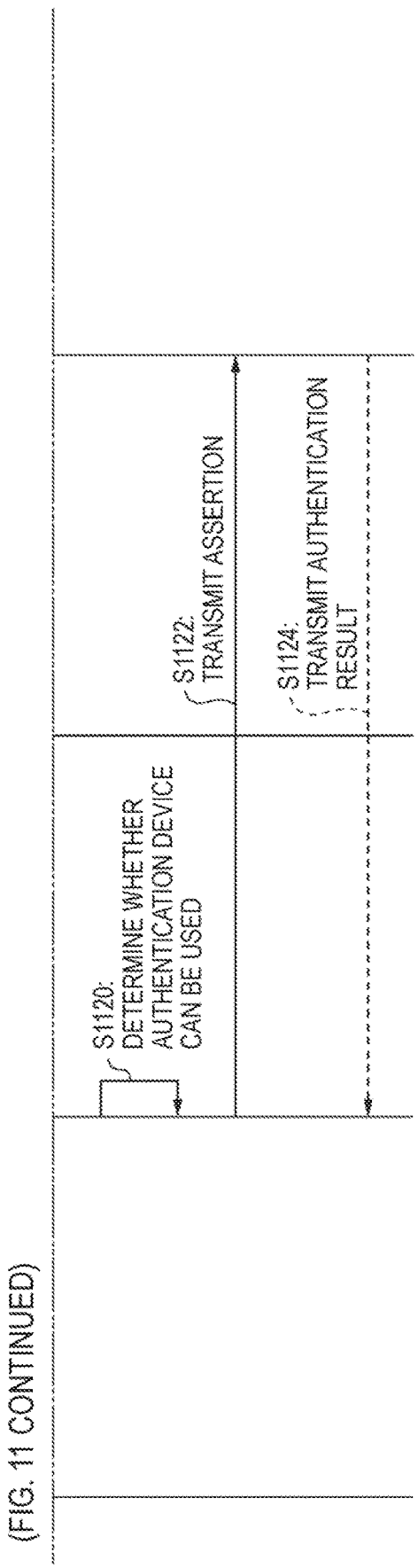

FIG. 13

| AUTHENTICATION DEVICE IDENTIFIER | VALIDITY |
|---|---|
| AUTH_a | VALID |
| AUTH_b | INVALID |
| AUTH_c | VALID |
| AUTH_d | VALID |
| AUTH_e | VALID |
| AUTH_f | INVALID |

| AUTHENTICATION DEVICE IDENTIFIER |
|---|
| AUTH_a |
| AUTH_c |
| AUTH_d |

1410 1400

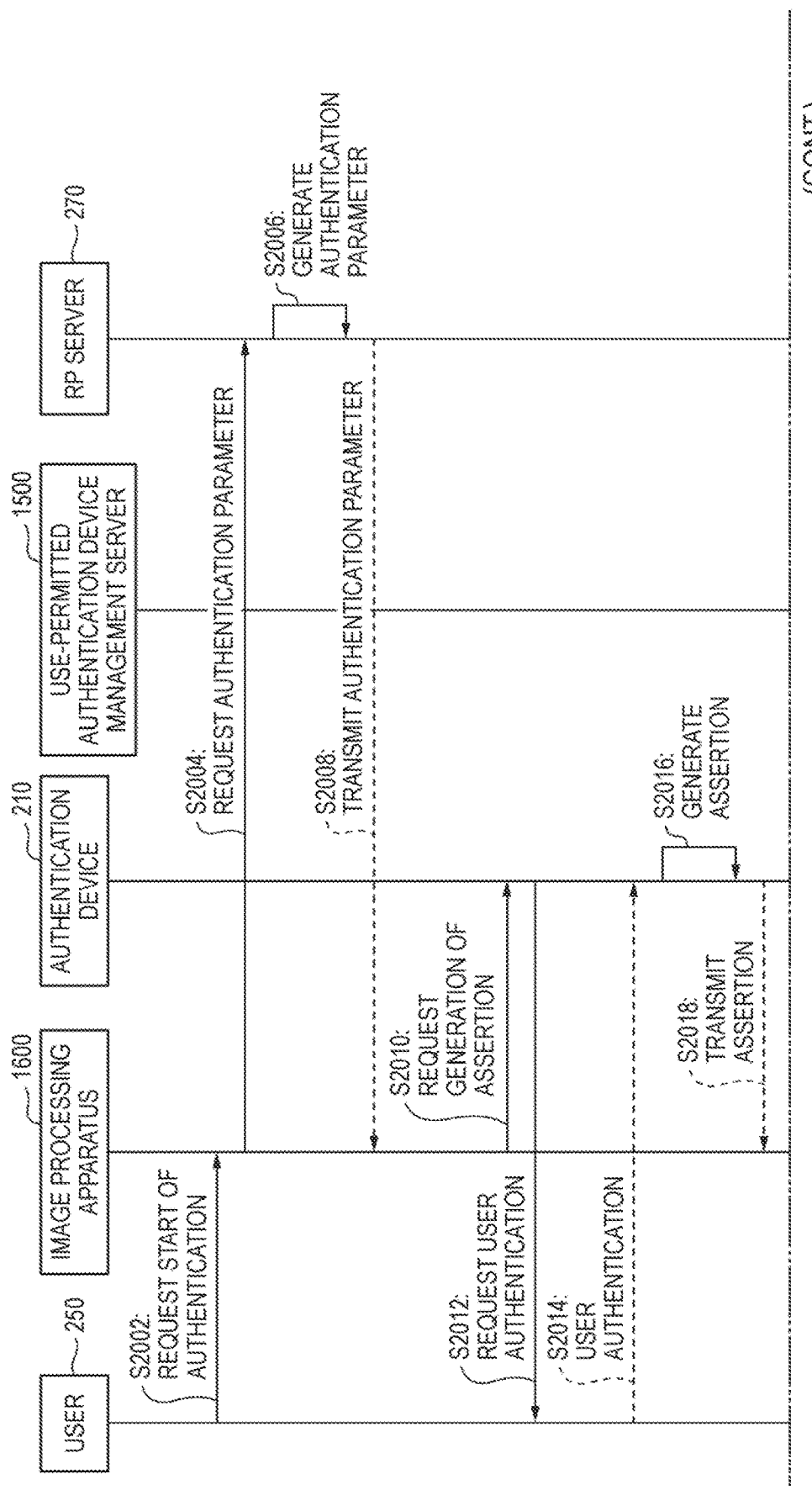

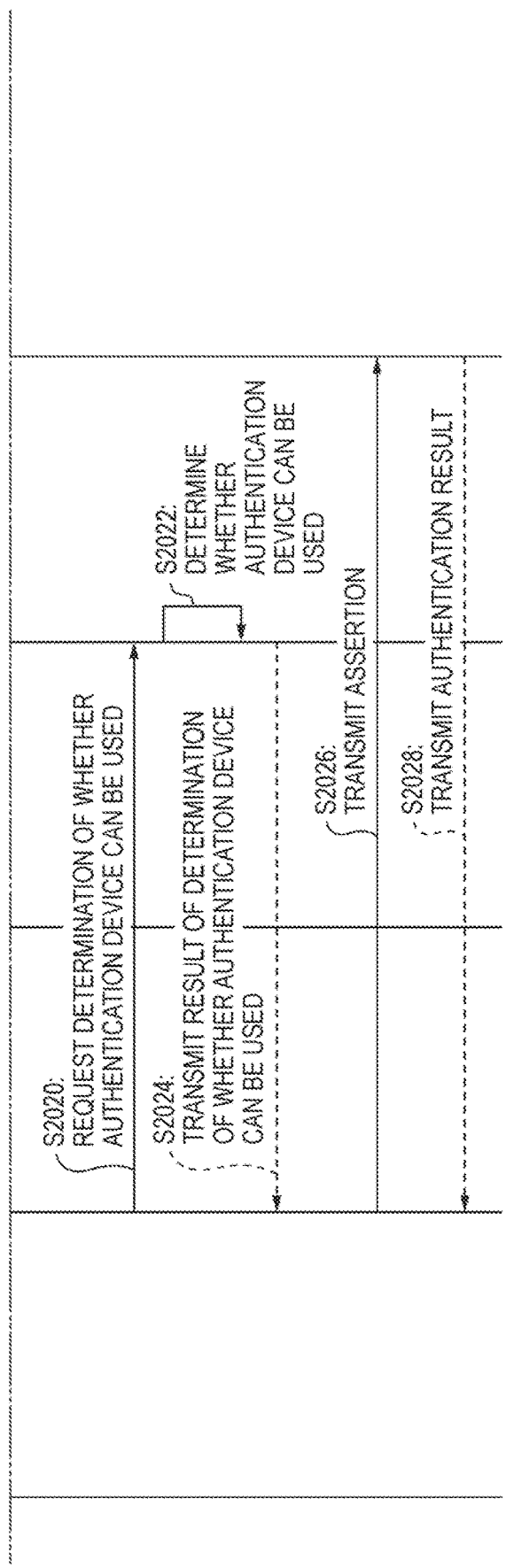

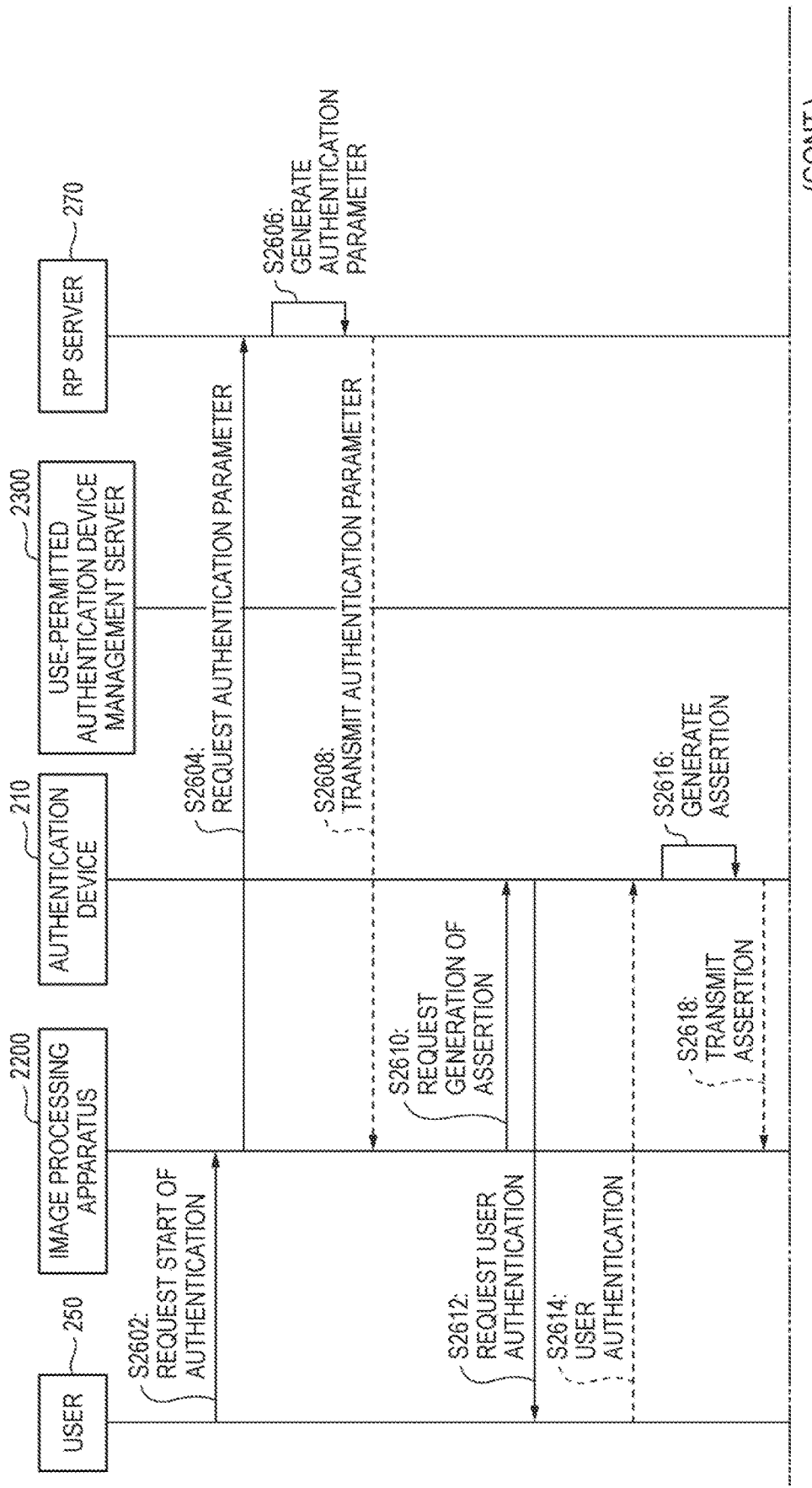

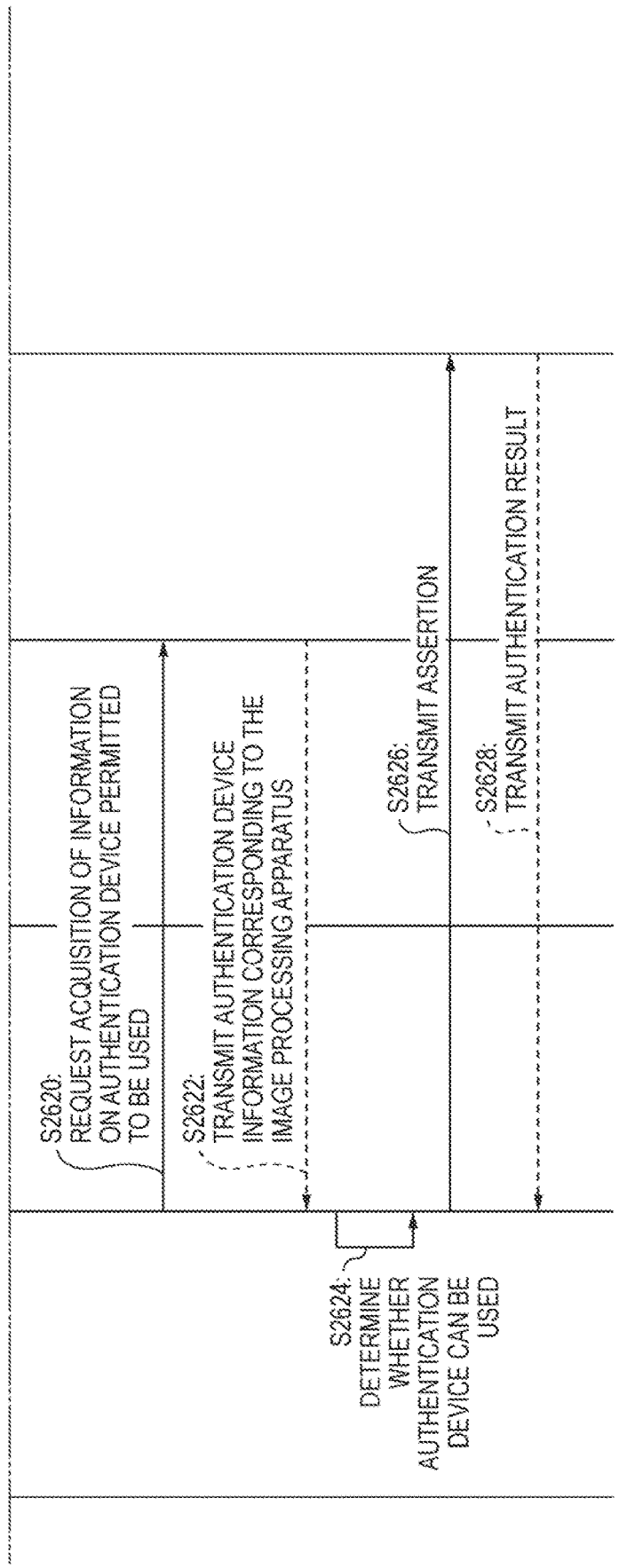

FIG. 34A

BEFORE UPDATING

3400a

| AUTHENTICATION DEVICE IDENTIFIER |
|---|
| AUTH_a |
| AUTH_c |
| AUTH_d |

NEWLY ACQUIRED LIST OF AUTHENTICATION DEVICE

3410

| AUTHENTICATION DEVICE IDENTIFIER | VALIDITY |
|---|---|
| AUTH_a | VALID |
| AUTH_b | INVALID |
| AUTH_c | VALID |
| AUTH_d | INVALID |
| AUTH_e | VALID |
| AUTH_f | INVALID |

AFTER UPDATING

3400c

| AUTHENTICATION DEVICE IDENTIFIER |
|---|
| AUTH_a |
| AUTH_c |

3402c

INFORMATION PROCESSING APPARATUS, METHOD, AND COMPUTER READABLE MEDIUM

CROSS-REFERENCE TO RELATED APPLICATIONS

This application is based on and claims priority under 35 USC 119 from Japanese Patent Application No. 2021-006838 filed on Jan. 20, 2021.

BACKGROUND

Technical Field

The present disclosure relates to an information processing apparatus, a method, and a computer readable medium storing a program.

Related Art

When using a network service via a device installed in a public place, if a user ID or password is input to an operation unit of the device, there is a risk of being peeped by a third party. Therefore, JP-A-2018-198400 discloses an image processing apparatus capable of communicating with a mobile terminal of a user, which includes an authentication module for biometric authentication. Upon receiving verification data issued by a service providing system, the image processing apparatus identifies the authentication module of the mobile terminal as the authentication module for the biometric authentication, and the authentication module of the mobile terminal executes an authentication process of the user.

SUMMARY

Although there are cases where it is desired to restrict an authentication device used by a user during FIDO (Fast IDentity Online) authentication, a FIDO client cannot restrict the authentication device.

Aspects of non-limiting embodiments of the present disclosure relate to providing an information processing apparatus, a method, and a computer readable medium storing an information processing program which enables a FIDO client to restrict an authentication device used by a user in FIDO authentication.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus, configured to function as a FIDO client, including: a memory configured to store authentication device information indicating an authentication device usable in FIDO authentication using the information processing apparatus; and a processor configured to acquire the authentication device information from an authentication device information management server to present the authentication device information to an administrator, cause the memory to store the authentication device information indicating an authentication device that is selected by the administrator as being connectable to the information processing apparatus, and, in response to an authentication start request from a user for FIDO authentication, in a case where an authentication device used by the user is not included in the authentication device indicated by the authentication device information stored in the memory, restrict use of an authentication device used by the user.

BRIEF DESCRIPTION OF DRAWINGS

Exemplary embodiment(s) of the present invention will be described in detail based on the following figures, wherein:

FIG. 9 is an explanatory diagram illustrating an example of a data structure of metadata;

FIG. 13 is an explanatory diagram illustrating an example of a data structure of an authentication device list table;

FIG. 14 is an explanatory diagram illustrating an example of a data structure of a use-permitted authentication device table;

FIG. 20 is a flowchart illustrating a process example according to the second exemplary embodiment;

FIG. 26 is a flowchart illustrating a process example according to the third exemplary embodiment;

FIGS. 34A, 34B and 34C show diagrams illustrating an example of data structures of a use-permitted authentication device table and an authentication device list table.

DETAILED DESCRIPTION

Hereinafter, examples of various exemplary embodiments for implementing the present disclosure will be described with reference to the drawings.

First Exemplary Embodiment

Figure 1:
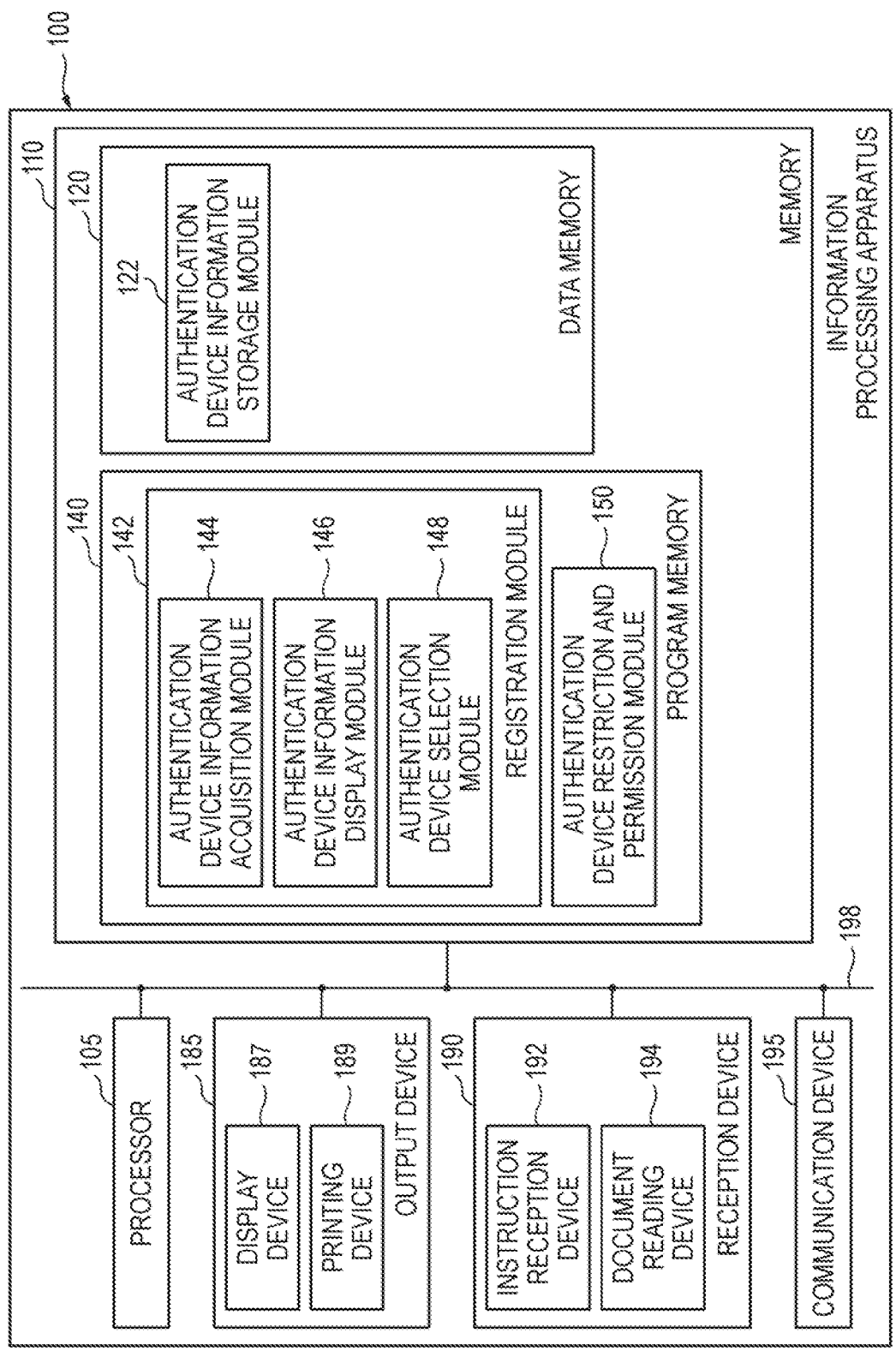
FIG. 1 is a conceptual module configuration diagram illustrating a configuration example according to a first exemplary embodiment (information processing apparatus)

FIG. 1 illustrates a conceptual module configuration diagram for a configuration example according to a first exemplary embodiment (information processing apparatus 100).

The term "module" generally refers to a logically separable component such as software (including a computer program as an interpretation of "software"), hardware, or the like. Therefore, the module in the present exemplary embodiment refers to not only a module in a computer program but also a module in a hardware configuration. Therefore, the exemplary embodiment also serves as a description of a computer program (for example, a program for causing a computer to execute each procedure, a program for causing a computer to function as each unit, a program for causing a computer to realize each function), a system, and a method for functioning these modules. However, although terms "store" and "stored" and equivalents thereof are used for the sake of convenience of description, these terms mean that being stored in a storage device or controlled to be stored in a storage device when the exemplary embodiment is a computer program. In implementation, modules may have a one-to-one correspondence with functions, in the implementation, one module may be configured by one program, plural modules may be configured by one program, and conversely, one module may be configured by plural programs. Plural modules may be executed by one computer, or one module may be executed by plural computers in a distributed or parallel environment. One module may include another module. Hereinafter, the term "connection" is used not only for physical connection but also for logical connections (for example, transmission and reception of data, instruction, reference relationship between data, login, or the like). The term "predetermined" means determined prior to target processing, and includes a meaning of being determined according to a situation or state at that time or according to the situation or state up to that time even after the process according to the present exemplary embodiment starts, as a matter of course, before the process according to the exemplary embodiment starts. When there are plural "predetermined values", the values may be different from each other, or two or more values ("two or more values" may include, of course, all values) may be the same. In addition, a description of "when A, do B" is used in a meaning of "determine whether it is A, do B when it is determined to be A". However, a case where it is not necessary to determine whether it is A is excluded. In addition, when a thing is listed such as "A, B, and C", "A, B, and C" are only examples unless otherwise specified, and include a case where only one of them is selected (for example, only A).

In addition, the system or the apparatus may be configured such that plural computers, hardware, apparatuses, and the like are connected by a communication unit such as a network ("network" including a one-to-one communication connection), or may be realized by a single computer, hardware, an apparatus, or the like. The terms "apparatus" and "system" are used as terms having the same meaning. Of course, the "system" does not include anything that is nothing more than a social "mechanism" (that is, a social system) that is an artificial agreement.

In addition, target information is read from the storage device for each processing by each module or for each processing when plural processing is performed in the module, and after the process is performed, a processing result is written to the storage device. Therefore, description of the reading from the storage device before the process and the writing to the storage device after the process may be omitted.

The information processing apparatus 100 according to the present exemplary embodiment functions as a FIDO client. The information processing apparatus 100 has a function of restricting an authentication device used by a user during FIDO authentication. As illustrated in an example of FIG. 1, the information processing apparatus 100 includes at least a processor 105 and a memory 110, and is configured by a bus 198 for connecting the processor and the memory and exchanging data. In addition, the information processing apparatus 100 may include an output device 185, a reception device 190, and a communication device 195. Data is exchanged between the processor 105, the memory 110, the output device 185, the reception device 190, and the communication device 195 via the bus 198.

The "FIDO authentication" is one authentication technique conforming to a standard developed based on FIDO Alliance. "FIDO" is an abbreviation of Fast IDentify Online.

When a RP server and an authentication device are connected to each other, the "FIDO client" is located therebetween so as to pass an authentication parameter from the RP server to the authentication device, causes the authentication device to generate an assertion, and transmits the assertion to the RP server. Detailed processing contents of the FIDO client will be described later with reference to examples of FIGS. 3 to 5.

Note that the block diagram illustrated in the example of FIG. 1 also illustrates an example of a hardware configuration of a computer that implements the exemplary embodiment. The hardware configuration of the computer in which the program according to the exemplary embodiment is executed is a computer as illustrated in FIG. 1, and specifically, may be used as a personal computer or a server. As a specific example, a processor 105 is used as a processing unit, and a memory 110 is used as a storage device.

The number of the processor 105 may be one or more. The processor 105 includes, for example, a central processing unit (CPU), a microprocessor, or the like. When plural processors 105 are used, either a tightly coupled multiprocessor or a loosely coupled multiprocessor may be used. For example, plural processor cores may be mounted in one processor 105. Further, it is also possible to use a system in which plural computers are virtually caused to behave as a single computer by connecting the plural computers through a communication path. As a specific example, a loosely coupled multiprocessor may be configured as a cluster system or a computer cluster. The processor 105 executes a program in a program memory 140.

The memory 110 may include, for example, a semiconductor memory in the processor 105 such as a register or a cache memory, may be a main memory that is a storage device including a random access memory (RAM) and a read only memory (ROM), or the like, an internal storage device such as a hard disk drive (HDD) or a solid state drive (SSD) having a function as a permanent storage device, an external storage device or an auxiliary storage device such as a CD, a DVD, a Blu-ray (registered trademark) Disc, a USB memory, or a memory card, or may include a storage device such as a server connected via a communication line.

The memory 110 includes a data memory 120 for storing data and a program memory 140 for storing programs. The data memory 120 and the program memory 140 may store a program such as an OS for starting the computer, data such as a parameter appropriately changed in execution of the module, or the like, in addition to the information shown and the module program.

The output device 185 includes, for example, a display device 187, a printing device 189, or the like. The display device 187 such as a liquid crystal display, an organic EL display, a three-dimensional display, or a projector displays a processing result by the processor 105, data in the data memory 120, or the like as text, image information, or the like. The printing device 189, such as a printer or a multi-function device, prints the processing result by the processor 105, the data in the data memory 120, or the like. The output device 185 may include a speaker, an actuator for vibrating the device, or the like.

The reception device 190 includes, for example, an instruction reception device 192, a document reading device 194, or the like. The instruction reception device 192 such as a keyboard, a mouse, a microphone, or a camera (including a line-of-sight detection camera or the like) receives data based on an operation (including an operation, a voice, a line of sight, or the like) of a user with respect to the keyboard, the mouse, the microphone, the camera (including the line-of-sight detection camera or the like).

Further, a touch screen may be provided with both functions of the display device 187 and the instruction reception device 192. In this case, with respect to realization of a function of the keyboard, even when there is no physical key, an image of a keyboard (also called a software keyboard, a screen keyboard, or the like) may be drawn on the touch screen by software so as to realize the function of the keyboard.

The display device 187 and the instruction reception device 192 are used as a user interface.

The document reading device 194 such as a scanner or a camera reads or captures a document and receives the generated image data.

The communication device 195 is a communication line interface such as a network card for connecting to other devices (an authentication device 210, an RP server 270, and an MDS server 280) via a communication line.

In the exemplary embodiment, for a computer program, the computer program that is software is read into the program memory 140 of the hardware configuration, and software and the hardware resources cooperate with each other to realize the exemplary embodiment. That is, the present exemplary embodiment is specifically realized by using hardware resources (including at least the processor 105, the memory 110, and in some cases the output device 185, the reception device 190, and the communication device 195) by the information processing by software, and the law of nature is used as a whole.

Note that the hardware configuration illustrated in FIG. 1 illustrates one configuration example, and the present exemplary embodiment is not limited to the configuration illustrated in FIG. 1, but may be any configuration as long as the module described in the present exemplary embodiment is executable. For example, as the processor 105, a GPU (abbreviation of Graphics Processing Unit, including GPGPU (abbreviation of General-Purpose Graphics Processing Units)) may be used, some of the modules may be executed by dedicated hardware (for example, an integrated circuit for a specific application (as a specific example, an ASIC (abbreviation of Application Specific Integrated Circuit) or the like) or a reconfigurable integrated circuit (as a specific example, an FPGA (abbreviation of Field-Programmable Gate Array) or the like), some modules may be in an external system and connected by a communication line, further, plural systems illustrated in FIG. 1 may be connected to each other by a communication line so as to cooperate with each other. In addition, particularly, in addition to a personal computer, the hardware may be incorporated into a portable information communication device (including a portable phone, a smartphone, a mobile device, a wearable computer, or the like), an information appliance, a robot, a copier, a fax machine, a scanner, a printer, a multifunction device (an image processing apparatus having two or more functions of a scanner, a printer, a copier, a fax machine, or the like), or the like.

The processor 105 is connected to the memory 110, the output device 185, the reception device 190, and the communication device 195 via the bus 198. The processor 105 executes processing according to a computer program describing an execution sequence of each module, which is a program in the program memory 140. For example, when an operation of the user is received by the instruction reception device 192, processing by a module corresponding to the operation in the program memory 140 is executed, the processing result is stored in the data memory 120, output to the display device 187, or transmitted to another device by controlling the communication device 195.

The memory 110 includes the data memory 120 and the program memory 140, and is connected to the processor 105, the output device 185, the reception device 190, and the communication device 195 via the bus 198.

The data memory 120 includes an authentication device information storage module 122.

The authentication device information storage module 122 stores authentication device information indicating authentication devices usable in FIDO authentication using the information processing apparatus 100.

Here, the "authentication device information" may include at least information indicating the authentication device. For example, authentication device information acquired from an authentication device information management server may include, in addition to the information indicating the authentication device, information indicating validity of the authentication device (for example, information indicating that the authentication device is valid or invalid).

The program memory 140 stores a registration module 142 and an authentication device restriction and permission module 150.

The registration module 142 includes an authentication device information acquisition module 144, an authentication device information display module 146, and an authentication device selection module 148.

The authentication device information acquisition module 144 acquires the authentication device information from the authentication device information management server.

The authentication device information display module 146 displays the authentication device information acquired by the authentication device information acquisition module 144 to an administrator.

The authentication device selection module 148 causes the authentication device information storage module 122 to store authentication device information indicating an authentication device that is selected by the administrator and connectable to the information processing apparatus 100.

When there is an authentication start request from a user during FIDO authentication, if an authentication device used by the user is not included in authentication devices indicated by the authentication device information stored in the authentication device information storage module 122, the authentication device restriction and permission module 150 restricts use of the authentication device. That is, the authentication device restriction and permission module 150 prevents use of authentication devices other than the authentication devices indicated by the authentication device information stored in the authentication device information storage module 122.

When the authentication device used by the user is included in the authentication devices indicated by the authentication device information stored in the authentication device information storage module 122, the authentication device restriction and permission module 150 may permit the use of the authentication device. That is, the authentication device restriction and permission module 150 only allows the authentication devices indicated by the authentication device information stored in the authentication device information storage module 122 to use the information processing apparatus 100 during FIDO authentication.

The authentication device restriction and permission module 150 may determine whether the authentication device used by the user is included in the authentication devices indicated by the authentication device information stored in the authentication device information storage module 122 after an assertion is acquired from the authentication device. That is, it is suitable for the authentication device restriction and permission module 150 to determine whether the authentication device used by the user is included in the authentication devices indicated by the authentication device information stored in the authentication device information storage module 122 after the assertion is acquired from the authentication device. This is because, when the assertion is acquired from the authentication device, the authentication device information of the authentication device is able to be acquired. However, an independent protocol for acquiring the authentication device information may be employed before the assertion is acquired from the authentication device.

Further, when the authentication device used by the user is included in the authentication devices indicated by the authentication device information stored in the authentication device information storage module 122, the authentication device restriction and permission module 150 may transmit the assertion acquired from the authentication device to the RP server. A challenge is transmitted from the RP server, and the assertion acquired from the authentication device is returned as a reply thereto. Since the authentication device used by the user is an authentication device indicated by the authentication device information stored in the authentication device information storage module 122, a protocol with the RP server is normally continued.

When the authentication device used by the user is not included in the authentication devices indicated by the authentication device information stored in the authentication device information storage module 122, the authentication device restriction and permission module 150 may transmit information indicating that assertion generation has failed to the RP server. A challenge is transmitted from the RP server, and the information indicating that the assertion generation has failed is returned as a reply thereto. Since the authentication device used by the user is not an authentication device indicated by the authentication device information stored in the authentication device information storage module 122, and there is no information indicating such a case (being an unauthorized authentication device) as the protocol with the RP server, the information indicating that the assertion generation has failed is returned and the protocol with the RP server is followed.

Figure 2:
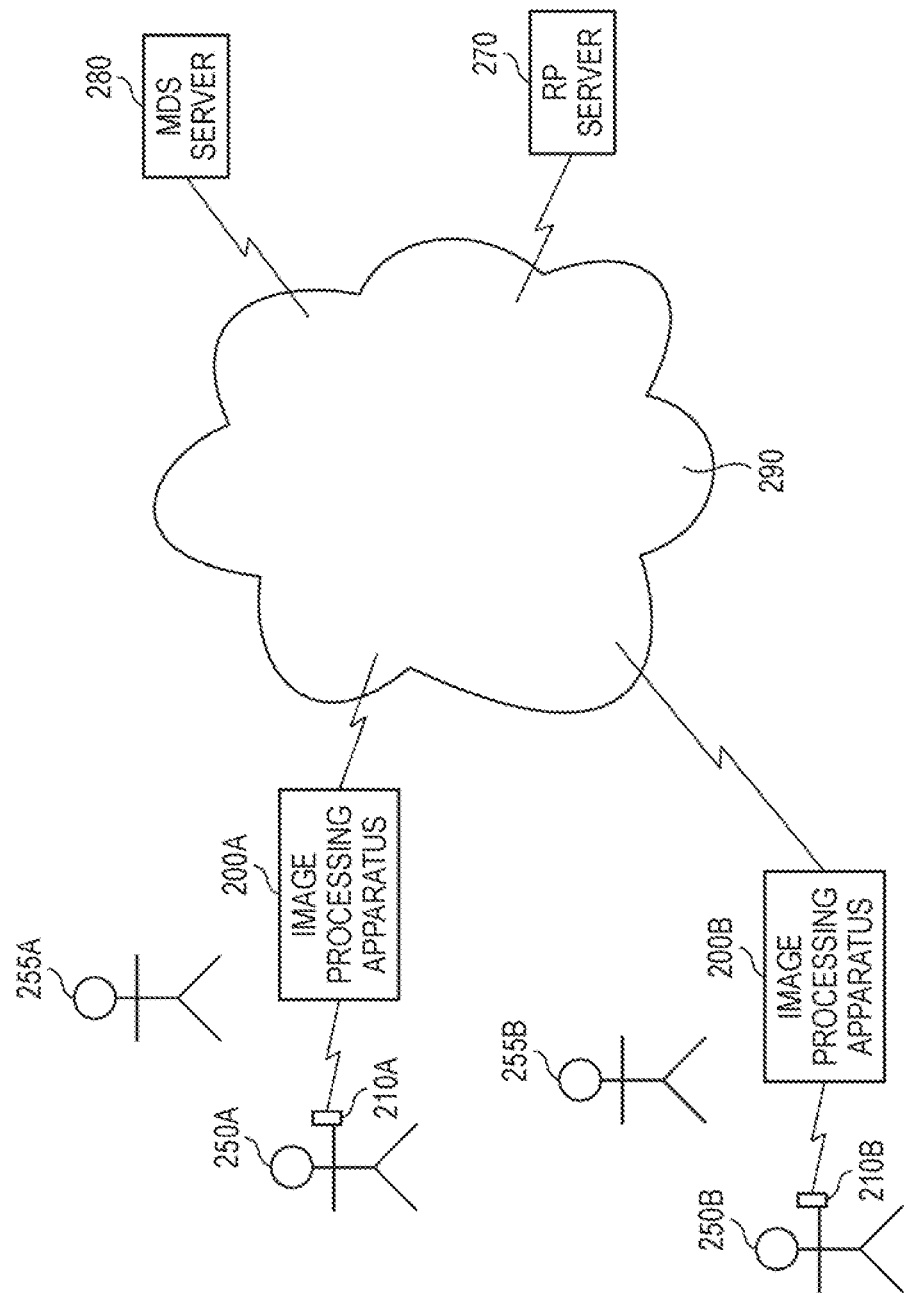
FIG. 2 is an explanatory diagram illustrating a system configuration example using the first exemplary embodiment.

FIG. 2 is an explanatory diagram illustrating a system configuration example using the first exemplary embodiment.

An image processing apparatus 200A, an image processing apparatus 200B, the RP server 270, and the MDS server 280 are connected to each other via a communication line 290. The communication line 290 may be wireless, wired, or a combination thereof, and may be, for example, the Internet, an intranet, or the like as a communication infrastructure. Functions of the RP server 270 and the MDS server 280 may be implemented as a cloud service.

The image processing apparatus 200 (the image processing apparatus 200A and the image processing apparatus 200B) is an exemplary embodiment of the information processing apparatus 100. Here, the image processing apparatus 200 is a multifunction device that has a function of the information processing apparatus 100 and has a function of a FIDO client during FIDO authentication.

The RP server 270 has a function as an RP (Relying Party) server during FIDO authentication. Specifically, a FIDO server and a Web server are implemented in such a manner that a user 250 is able to perform FIDO authentication using authentication with the image processing apparatus 200, and a predetermined Web application is published.

The MDS server 280 has a function as the above-described authentication device information management server.

The authentication device 210 (authenticator) is a device that authenticates biometrics of the user 250. For example, a smartphone, a wearable computer, or the like is applicable.

The image processing apparatus 200A is used by a user 250A and an administrator 255A.

The user 250A carries an authentication device 210A. The image processing apparatus 200A and the authentication device 210A are connected to each other via a communication line.

The image processing apparatus 200B is used by a user 250B and an administrator 255B.

The user 250B carries an authentication device 210B. The image processing apparatus 200B and the authentication device 210B are connected to each other via a communication line.

The administrator 255 operates the image processing apparatus 200 to perform setting for restricting the authentication device 210 to be used in the FIDO authentication. At this time, communication with the MDS server 280 is performed.

Thereafter, when the user 250 uses the authentication device 210 to use the FIDO authentication, the image processing apparatus 200 determines whether the authentication device 210 is the authentication device 210 permitted by the administrator 255, and performs control in such a manner that the FIDO authentication using the RP server 270 may be used if the authentication device 210 is permitted, and the FIDO authentication cannot be used if the authentication device 210 is not permitted.

A FIDO authentication technology used in the present exemplary embodiment will be described with reference to FIGS. 3 and 4.

Figure 3:
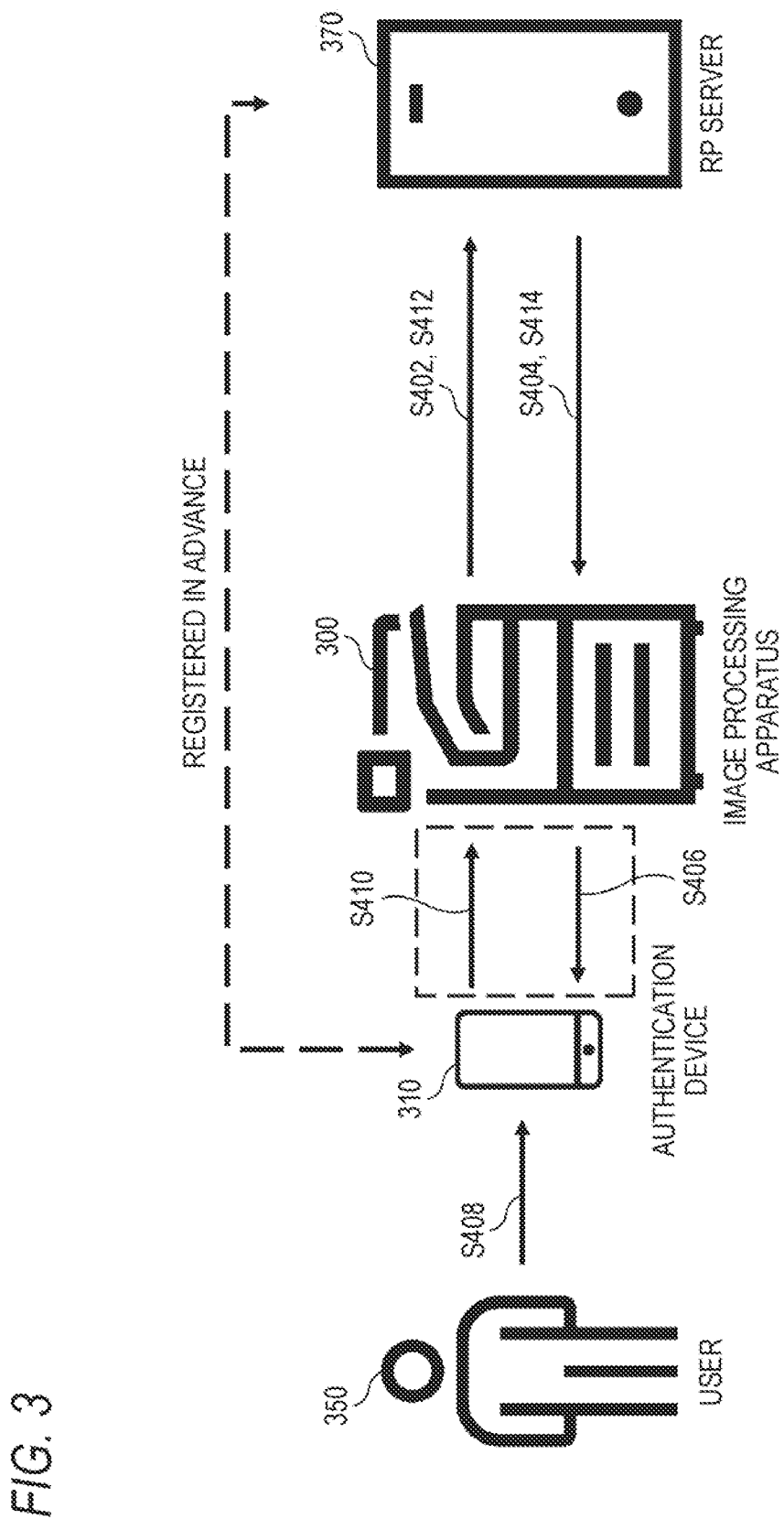
FIG. 3 is an explanatory diagram illustrating an example of FIDO authentication technology employed in the first exemplary embodiment.
Figure 4:
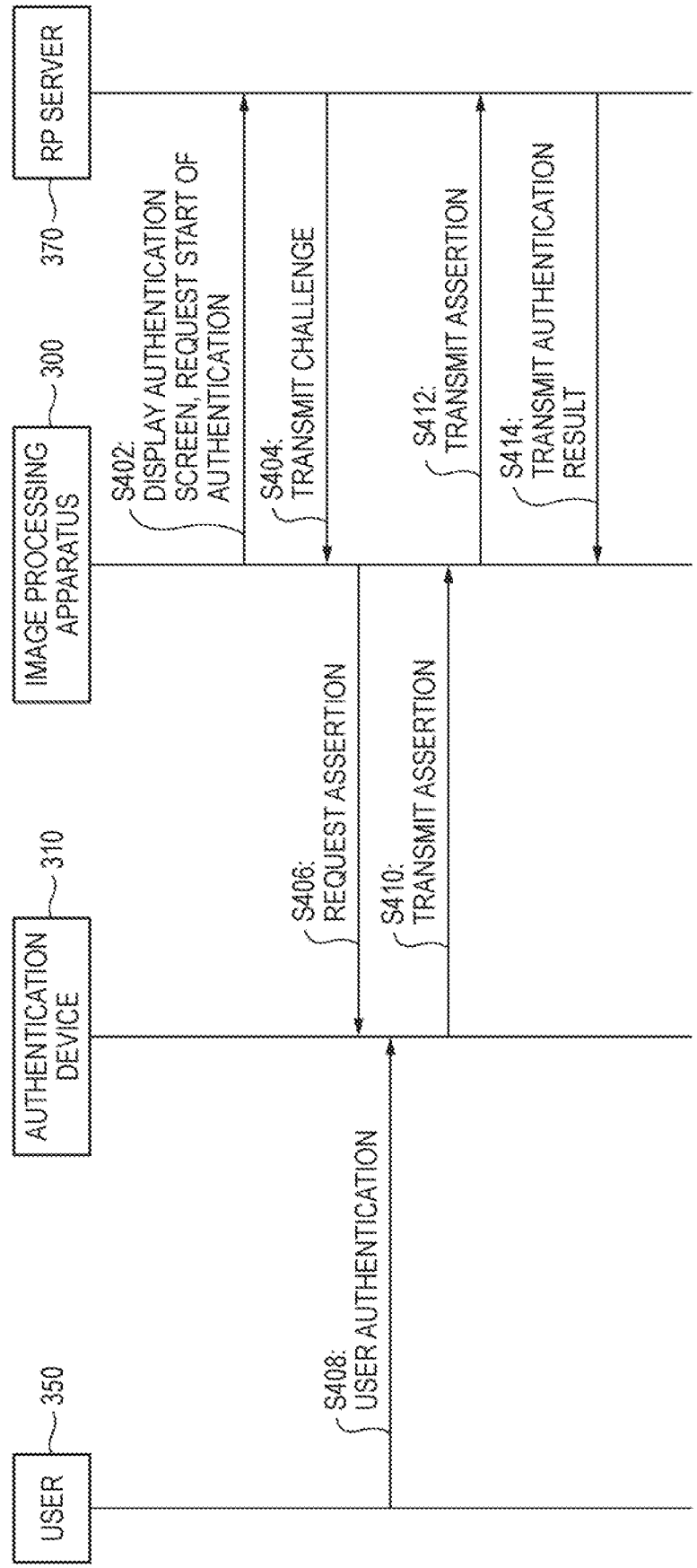
FIG. 4 is a flowchart illustrating a process example of FIDO authentication technology.

FIG. 3 is an explanatory diagram illustrating an example of FIDO authentication technology. FIG. 4 is a flowchart illustrating a process example according to FIDO authentication technology.

FIDO authentication is performed between an authentication device 310 and an RP server 370 with an image processing apparatus 300 serving as an intermediary.

The authentication device 310 and the image processing apparatus 300 are connected to each other by, for example, USB, Bluetooth Low Energy (BLE), Near Field Communication (NFC), or the like.

In step S402, the image processing apparatus 300 displays an authentication screen to a user 350 and requests the RP server 370 to start authentication.

In step S404, the RP server 370 transmits a challenge of FIDO authentication to the image processing device 300. The challenge is a random (including a pseudo random number) character string generated by the RP server 370.

In step S406, the image processing apparatus 300 requests the authentication device 310 to generate an assertion of FIDO authentication. The assertion is a certificate of a verification result, and is specifically a signed challenge.

In step S408, the user 350 uses the authentication device 310 to perform user authentication using biometric information. Examples of the biometric information include a fingerprint, a face, a retina, an iris, and a palm vein pattern of the user 350.

In step S410, the authentication device 310 transmits the assertion of FIDO authentication to the image processing apparatus 300.

In step S412, the image processing apparatus 300 transmits the assertion received in step S410 to the RP server 370.

In step S414, the RP server 370 performs authentication using the challenge transmitted in step S404 and the assertion received in step S410, and transmits an authentication result to the image processing apparatus 300.

Figure 5:
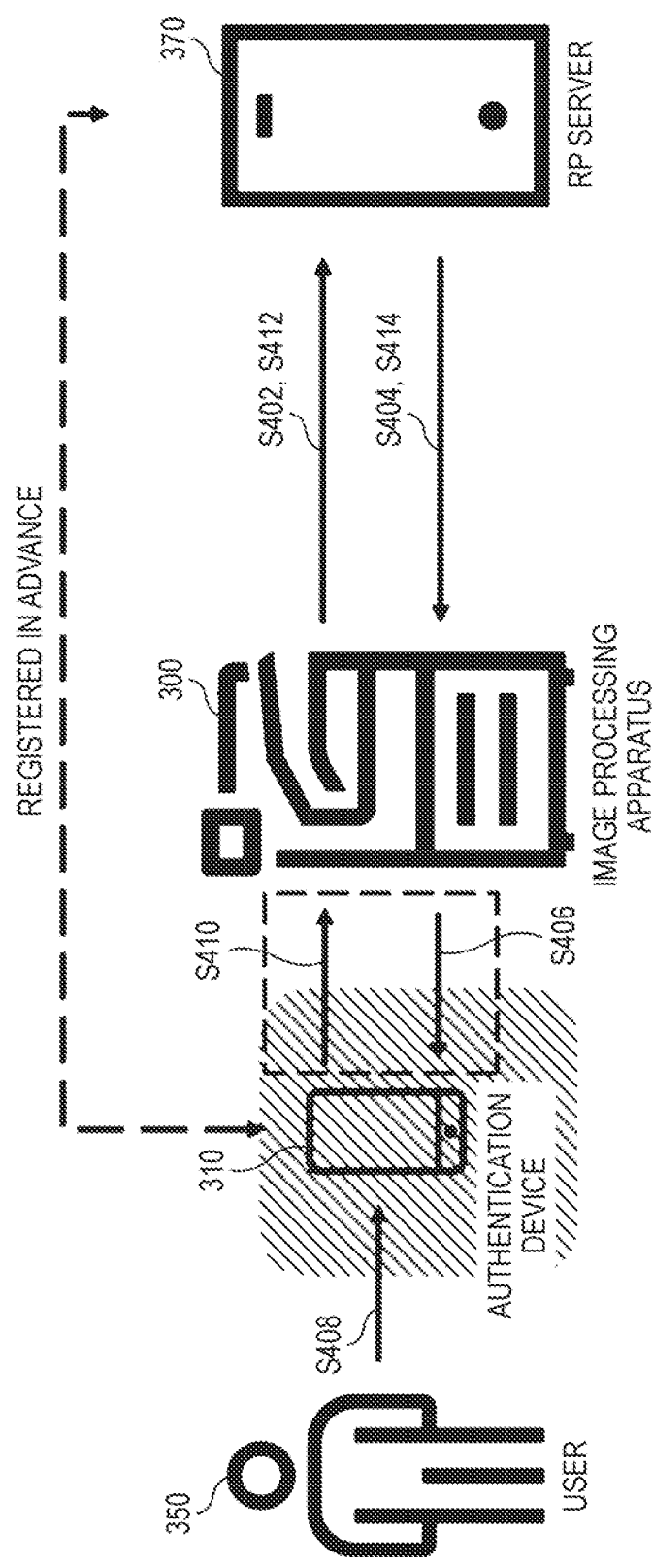
FIG. 5 is an explanatory diagram illustrating an example of FIDO authentication technology.

FIG. 5 is an explanatory diagram illustrating an example of the related art.

In the FIDO authentication technology described above, it is necessary to register the authentication device 310 in advance. Thereafter, processing illustrated in the examples of FIGS. 3 and 4 is performed.

Here, there are cases where it is desired to restrict the authentication device 310 to be connected to the image processing apparatus 300 during FIDO authentication. For example, there is a case where it is not desired to connect the authentication device 310 that is not authorized in a company to the image processing apparatus 300. That is, there is a case where it is desired to set restriction such that only the authentication device 310 of a predetermined model is able to connect to the image processing apparatus 300. However, according to a FIDO authentication standard, the image processing apparatus 300 cannot restrict the authentication device 310 registered in the RP server 370.

In a case where the image processing apparatus 300 attempts to restrict the authentication device 310 by using a whitelist method in which devices permitted to be connected are listed, for example, in a case where a USB connection is established between the image processing apparatus 300 and the authentication device 310, it takes time to check a vendor ID and a product ID of the authentication device 310. Specifically, it is necessary to connect each authentication device 310 to a PC or the like and check such IDs.

Figure 6:
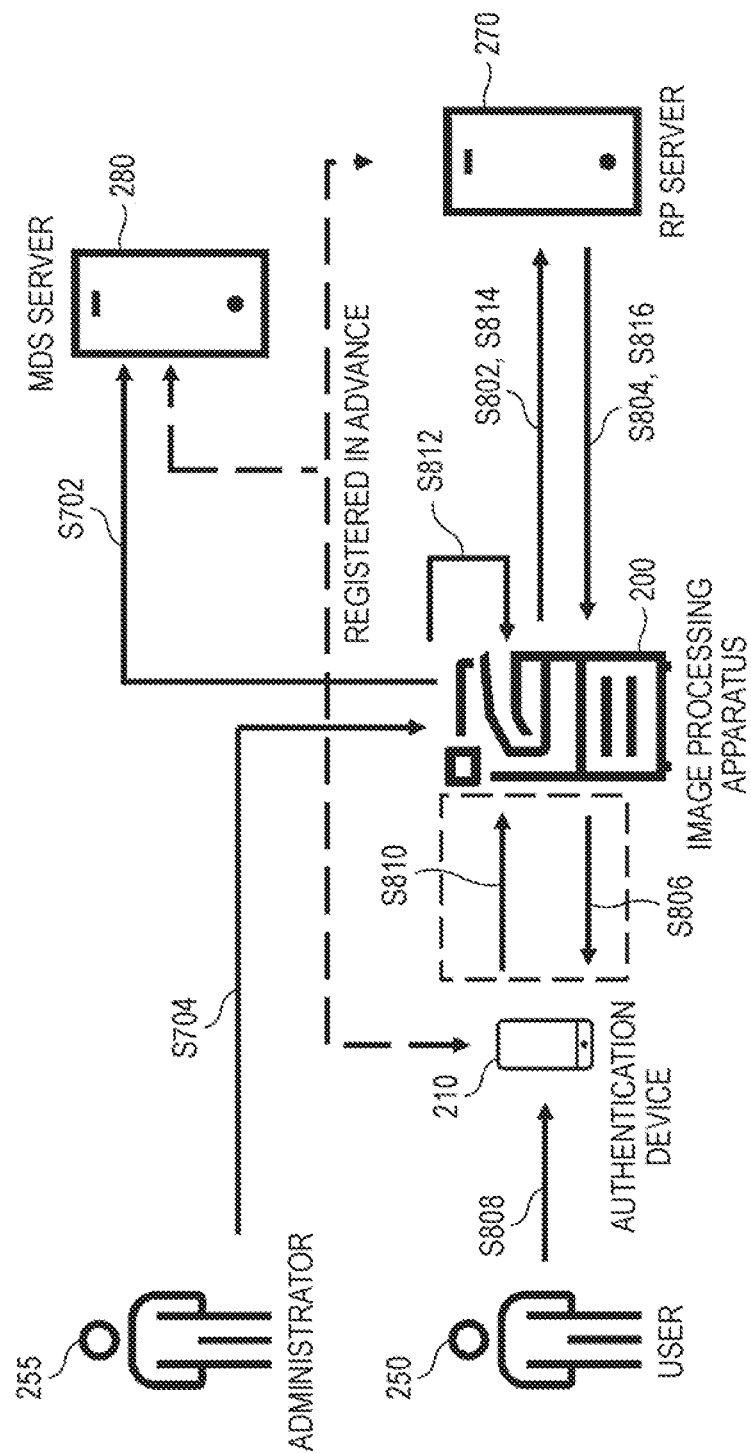
FIG. 6 is an explanatory diagram illustrating a process example according to the first exemplary embodiment.
Figure 7:
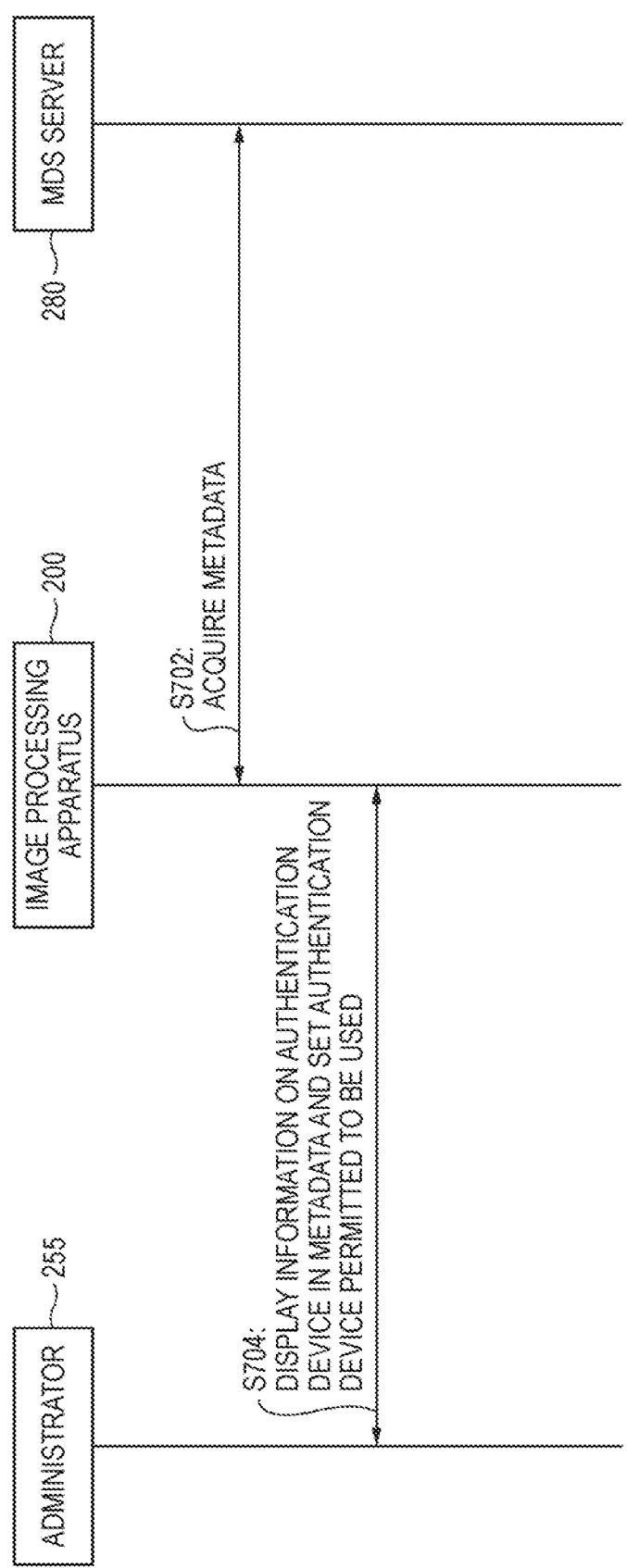
FIG. 7 is a flowchart illustrating a process example according to the first exemplary embodiment.
Figure 8:
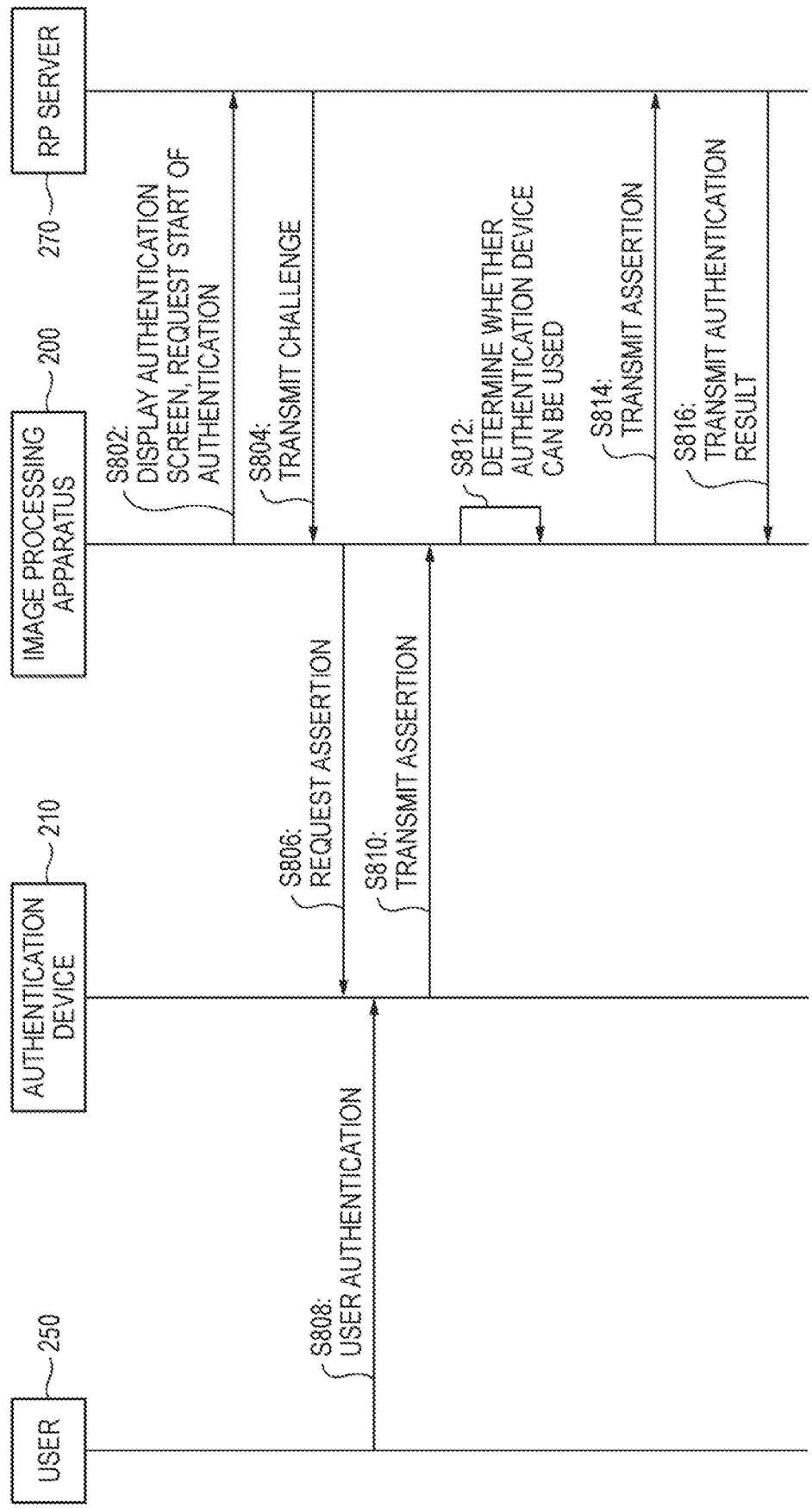
FIG. 8 is a flowchart illustrating a process example according to the first exemplary embodiment.

Process examples according to the first exemplary embodiment will be described with reference to examples of FIGS. 6, 7, and 8. FIG. 6 is an explanatory diagram illustrating the process example according to the first exemplary embodiment. FIG. 7 is a flowchart illustrating a process example (a registration process example) according to a first exemplary embodiment. FIG. 8 is a flowchart illustrating a process example (an authentication process example) according to the first exemplary embodiment.

Information on the authentication device 210 is referred to as metadata (an example of authentication device information), and is registered in the MDS server 280 and the RP server 270 through the MDS server 280. MDS is an abbreviation for Meta Data Service. The MDS server 280 is a server provided by FIDO alliance. Detailed information is listed on the following homepage.

<https://fidoalliance.org/metadata/>

The MDS server 280 manages information (vendor name, UUID, authentication acquisition date, and the like) on all authentication devices 210 that have acquired FIDO authentication (FIDO Certified). Such pieces of information are updated. Such update is performed, for example, daily. The information (JSON format) on all the authentication devices 210 may also be acquired from the MDS server 280 by an online application.

In the first exemplary embodiment, the MDS server 280 is used such that the authentication device 210 to be used by the image processing apparatus 200 may be restricted.

The process example (registration process example) according to the first exemplary embodiment will be described with reference to FIGS. 6 and 7.

In step S702, the image processing apparatus 200 acquires metadata from the MDS server 280.

In step S704, the image processing apparatus 200 displays information on the authentication device 210 in the metadata to the administrator 255, and sets the authentication device 210 permitted to be used by the image processing apparatus 200 in response to an operation of the administrator 255. That is, the authentication device information indicating the authentication device 210 connectable to the image processing apparatus 200 is stored in the authentication device information storage module 122.

The process example (authentication process example) according to the first exemplary embodiment will be described with reference to FIGS. 6 and 8.

In step S802, the image processing apparatus 200 displays an authentication screen and requests the RP server 270 to start authentication.

In step S804, the RP server 270 transmits a challenge to the image processing apparatus 200.

In step S806, the image processing apparatus 200 requests the authentication device 210 to generate an assertion.

In step S808, the user 250 uses the authentication device 210 to perform user authentication.

In step S810, the authentication device 210 transmits the assertion to the image processing apparatus 200.

Processes from step S802 to step S810 are equivalent to processes from step S402 to step S410 described above in the example of FIG. 4.

In step S812, the image processing apparatus 200 determines whether the authentication device 210 can be used. That is, it is determined whether metadata of the authentication device 210 is stored in the authentication device information storage module 122, the use of the authentication device 210 is permitted when the metadata is stored in the authentication device information storage module 122, and the use of the authentication device 210 is not permitted when the metadata is not stored in the authentication device information storage module 122.

In step S814, the image processing apparatus 200 transmits the assertion to the RP server 270. When the use of the authentication device 210 is permitted, the assertion received in step S810 is transmitted to the RP server 270, and when the use of the authentication device 210 is prohibited, information indicating that assertion generation has failed is transmitted to the RP server 270.

In step S816, the RP server 270 transmits an authentication result to the image processing apparatus 200. When the assertion is received (that is, when the use of the authentication device 210 is permitted), authentication is performed by using the challenge transmitted in step S804 and the assertion received in step S814, and the authentication result is transmitted to the image processing apparatus 200. When the information indicating that the assertion generation has failed is received (that is, when the use of the authentication device 210 is not permitted), nothing may be performed, or information indicating a failure may be transmitted as the authentication result to the image processing apparatus 200.

FIG. 9 is an explanatory diagram illustrating an example of a data structure of metadata 900. The metadata 900 is stored in the MDS server 280, and is acquired by the image processing apparatus 200 from the MDS server 280 in step S702 in the flowchart illustrated in the example of FIG. 7.

The metadata 900 includes next scheduled update date information 902 and one or more pieces of authentication device information 904.

For example, "next Update": "2020-01-03"" is described in the next scheduled update date information 902, which indicates that a next scheduled update date of the metadata 900 is "Jan. 3, 2020".

In addition, "status" in the authentication device information 904 represents a state of the authentication device 210. Possible values are defined in the following URL. <https://fidoalliance.org/specs/fido-v2.0-id-20180227/fido-metadata-service-v2.0-id-20180227.html#authenticatorstatus-enum>

For example, "FIDO_CERTIFIED" indicates that "FIDO authentication has been acquired", and "REVOKED" indicates "should not be trusted", which is a state regarded by FIDO alliance for certain reasons. The "REVOKED" corresponds to a case where the authentication device is unauthorized, a case where it is determined that a back door is installed in the authentication device, or the like.

Figure 10:
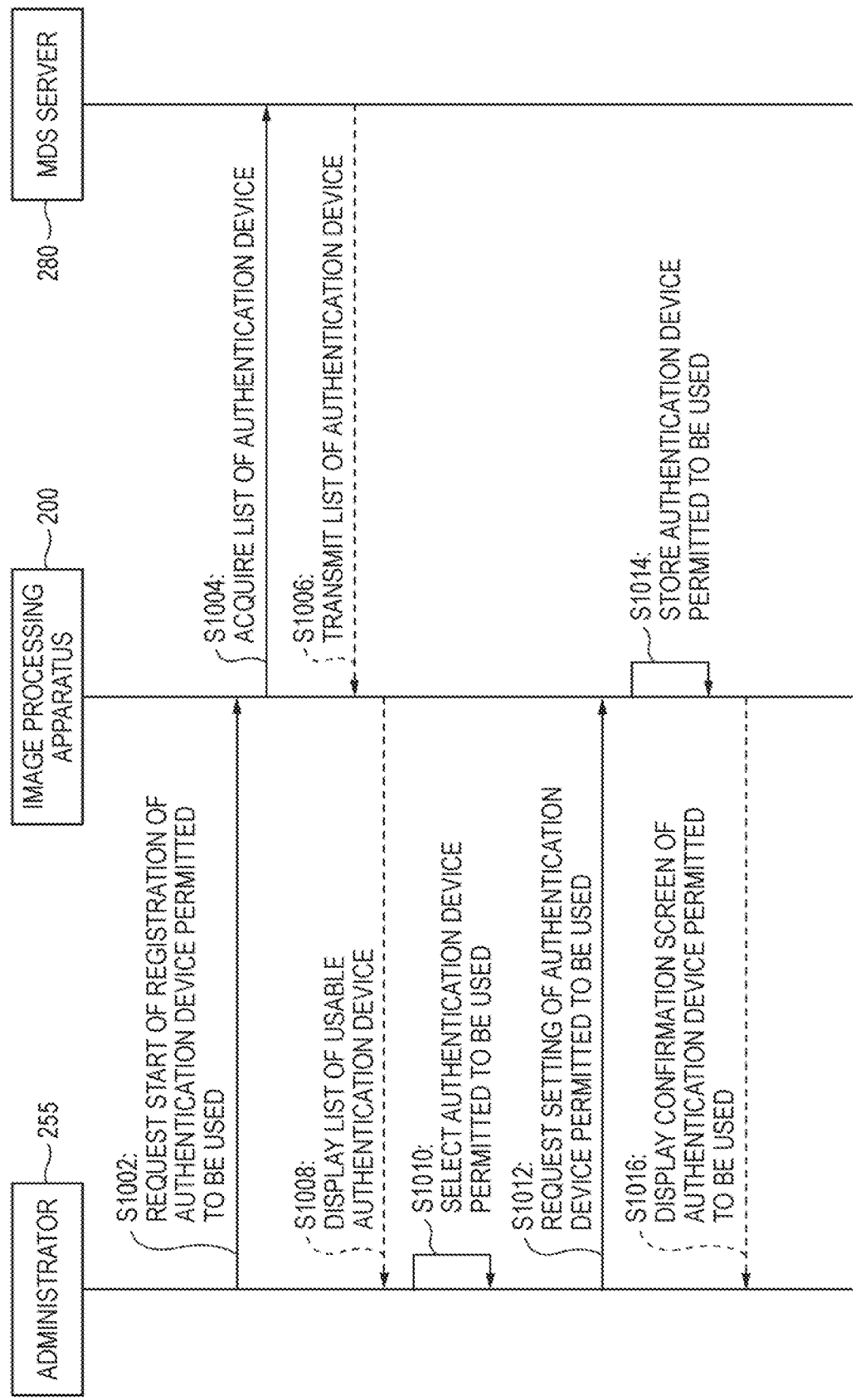
FIG. 10 is a flowchart illustrating a process example according to the first exemplary embodiment.

FIG. 10 is a flowchart illustrating a process example (a registration process example) according to the first exemplary embodiment. The process example illustrated in the example of FIG. 7 is described in more detail.

In step S1002, the administrator 255 requests the image processing apparatus 200 to start registration of an authentication device permitted to be used. For example, the image processing apparatus 200 may detect that the administrator 255 selects a "register authentication device" button on a management screen.

In step S1004, the image processing apparatus 200 acquires a list of authentication devices from the MDS server 280. Specifically, the metadata 900 is acquired.

In step S1006, the MDS server 280 transmits the list of authentication devices to the image processing apparatus 200.

In step S1008, the image processing apparatus 200 displays a list of usable authentication devices to the administrator 255. Specifically, an authentication device that is "FIDO_CERTIFIED" and is not "REVOKED" in the metadata 900 is displayed on a screen of the image processing apparatus 200. Further, an authentication device that employs a communication method capable of communicating with the image processing apparatus 200 may be selected and displayed on the screen of the image processing apparatus 200.

In step S1010, the administrator 255 selects an authentication device permitted to be used from the list of authentication devices. For example, the administrator 255 selects an authentication device that is permitted to be used in a company.

In step S1012, the administrator 255 requests the image processing apparatus 200 to set the authentication device permitted to be used.

In step S1014, the image processing apparatus 200 stores the authentication device permitted to be used. The authentication device information storage module 122 in the image processing apparatus 200 is thus in a state where the authentication device information indicating the authentication device usable in FIDO authentication using the image processing apparatus 200 is stored.

In step S1016, the image processing apparatus 200 displays, to the administrator 255, a confirmation screen of the authentication device permitted to be used.

Figure 11:
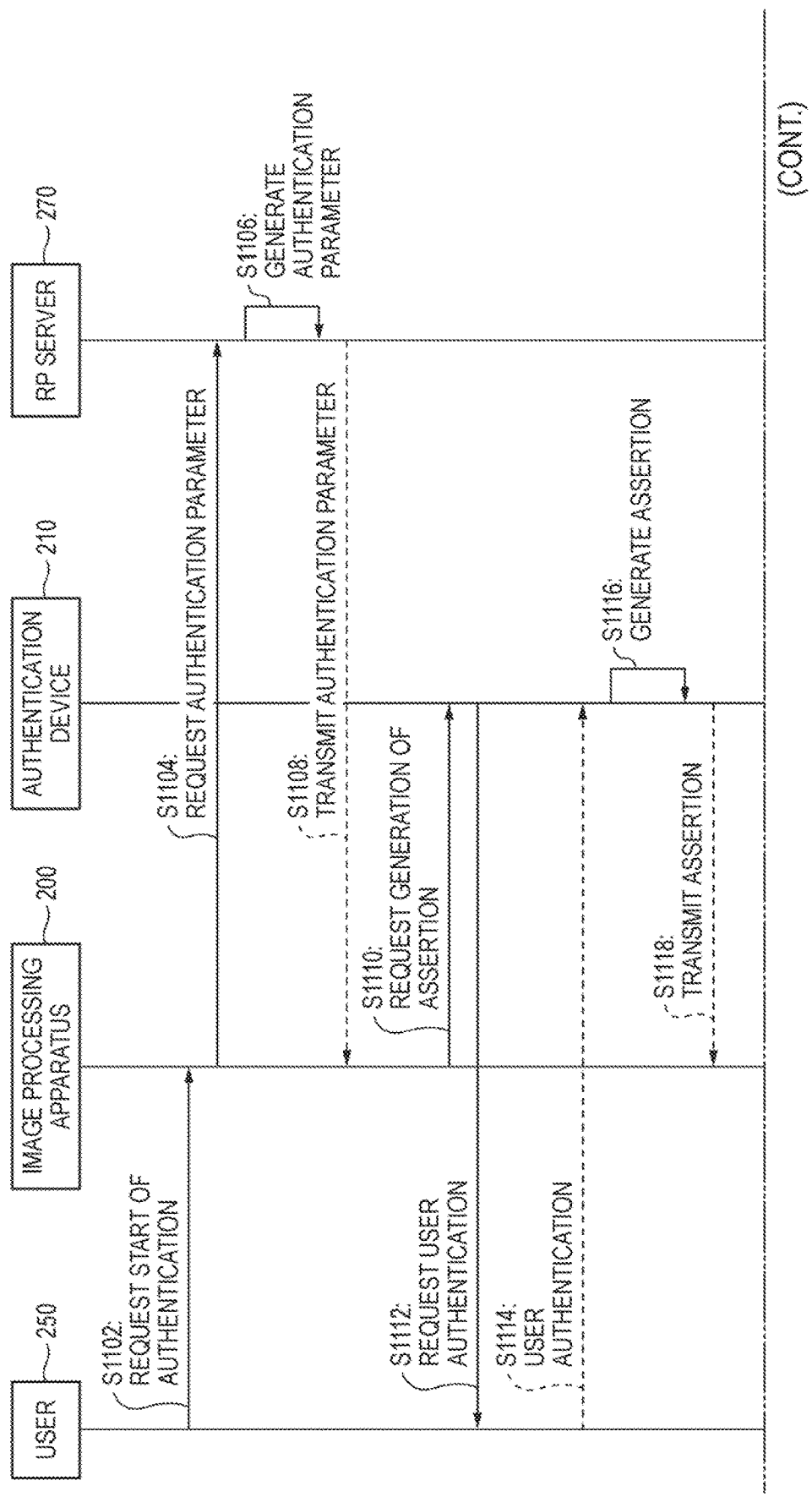
FIG. 11 is a flowchart illustrating a process example according to the first exemplary embodiment.

FIG. 11 is a flowchart illustrating a process example (an authentication process example) according to the first exemplary embodiment. The process example illustrated in the example of FIG. 8 is described in more detail.

In step S1102, the user 250 requests the image processing apparatus 200 to start authentication by FIDO authentication.

In step S1104, the image processing apparatus 200 requests the RP server 270 for an authentication parameter.

In step S1106, the RP server 270 generates the authentication parameter. The authentication parameter here corresponds to the challenge illustrated in the example of FIG. 8.

In step S1108, the RP server 270 transmits the authentication parameter to the image processing apparatus 200.

In step S1110, the image processing apparatus 200 requests the authentication device 210 to generate an assertion.

In step S1112, the authentication device 210 requests the user 250 to perform user authentication.

In step S1114, the user 250 uses the authentication device 210 to perform the user authentication. Specifically, as described above, a fingerprint, a face, or the like, which is biometric information of the user 250, is read by the authentication device 210 to perform biometric authentication by the authentication device 210.

In step S1116, when the biometric authentication is successful, the authentication device 210 generates the assertion. Of course, when the biometric authentication is not successful, the authentication device 210 does not generate the assertion, and the assertion generation thus fails.

In step S1118, the authentication device 210 transmits the assertion to the image processing apparatus 200.

In step S1120, the image processing apparatus 200 determines whether the authentication device 210 can be used. In step S1014 in the flowchart illustrated in the example of FIG. 10, the authentication device information stored in the authentication device information storage module 122 is used. That is, it is determined whether the target authentication device 210 coincides with the authentication device indicated by the authentication device information stored in the authentication device information storage module 122. If coincides, use of the authentication device 210 is permitted, and if does not coincide, the use of the authentication device 210 is not permitted.

In step S1122, the image processing apparatus 200 transmits the assertion to the RP server 270. More specifically, when the biometric authentication is successful in step S1114 and the use of the authentication device 210 is permitted in step S1120, the assertion received in step S1118 is directly transmitted to the RP server 270. When the biometric authentication fails in step S1114 or when the use of the authentication device 210 is not permitted in step S1120, information indicating that the assertion generation has failed is transmitted to the RP server 270.

In step S1124, the RP server 270 transmits an authentication result to the image processing apparatus 200. When the assertion is received, authentication is performed by using the authentication parameter generated in step S1106 and the assertion received in step S1122, and the authentication result is transmitted to the image processing apparatus 200. When the information indicating that the assertion generation has failed is received, nothing may be performed, or information indicating a failure may be transmitted as the authentication result to the image processing apparatus 200.

Figure 12:
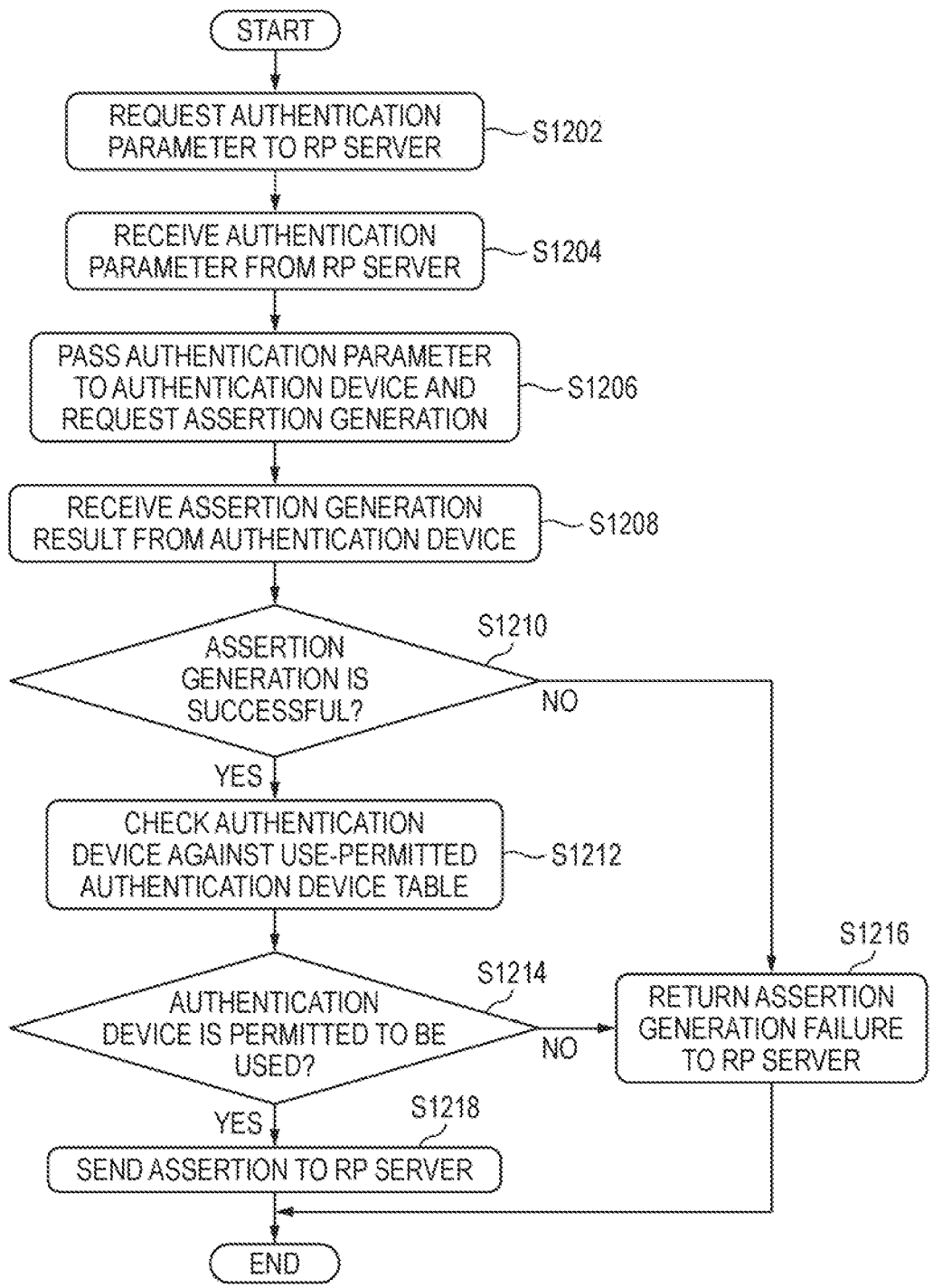
FIG. 12 is a flowchart illustrating a process example according to the first exemplary embodiment.

FIG. 12 is a flowchart illustrating a process example (an authentication process example) according to the first exemplary embodiment (the information processing apparatus 100 and the image processing apparatus 200).

In step S1202, an authentication parameter is requested to the RP server 270.

In step S1204, the authentication parameter is received from the RP server 270.

In step S1206, the authentication parameter is passed to the authentication device 210 and assertion generation is requested.

In step S1208, an assertion generation result is received from the authentication device 210.

In step S1210, it is determined whether the assertion generation is successful. If successful, the process proceeds to step S1212. Otherwise, the process proceeds to step S1216.

In step S1212, the authentication device 210 is checked against a use-permitted authentication device table 1400. The use-permitted authentication device table 1400 will be described later with reference to an example of FIG. 14.

In step S1214, it is determined whether the authentication device 210 is permitted to be used. If permitted, the process proceeds to step S1218. Otherwise, the process proceeds to step S1216.

In step S1216, an assertion generation failure is returned to the RP server 270.

In step S1218, the assertion is sent to the RP server 270.

FIG. 13 is an explanatory diagram illustrating an example of a data structure of an authentication device list table 1300. The authentication device list table 1300 is generated by the image processing apparatus 200 acquiring the metadata 900 from the MDS server 280.

The authentication device list table 1300 includes an authentication device identifier column 1310 and a validity column 1320. The authentication device identifier column 1310 stores an identifier that is information for identifying an authentication device. The validity column 1320 stores validity of the authentication device. In the authentication device list table 1300, a pair of the identifier of the authentication device and information indicating the validity is described. Types of the validity include, for example, valid and invalid. As described above, the authentication device that is "REVOKED" in the metadata 900 is invalid.

For example, in the authentication device list table 1300, a first line indicates that an authentication device identifier AUTH_a is valid, a second line indicates that an authentication device identifier AUTH_b is invalid, a third line indicates that an authentication device identifier AUTH_c is valid, a fourth line indicates that an authentication device identifier AUTH_d is valid, a fifth line indicates that an authentication device identifier AUTH_e is valid, and a sixth line indicates that an authentication device identifier AUTH_f is invalid.

The authentication device list table 1300 may be identified by a version or an issuance date and time of the metadata 900. The authentication device list table 1300 illustrated in the example of FIG. 13 is generated from the metadata 900 of version 1.0.

When the information processing apparatus 100 (the image processing apparatus 200) displays the authentication device list table 1300 to the administrator 255, invalid authentication devices may not be displayed on a use-permitted authentication device setting screen, or may be highlighted. The administrator 255 operates the use-permitted authentication device setting screen to select an authentication device permitted to be used by the information processing apparatus 100 (the image processing apparatus 200).

FIG. 14 is an explanatory diagram illustrating an example of a data structure of the use-permitted authentication device table 1400. The use-permitted authentication device table 1400 is generated from the authentication device list table 1300. That is, the use-permitted authentication device table 1400 is a list of "authentication devices permitted to be used in the information processing apparatus 100 (image processing apparatus 200)" selected in the information processing apparatus 100 (image processing apparatus 200) by the administrator 255.

The use-permitted authentication device table 1400 includes an authentication device identifier column 1410. The authentication device identifier column 1410 stores an authentication device identifier.

The use-permitted authentication device table 1400 indicates that the authentication devices permitted to be used by the information processing apparatus 100 (the image processing apparatus 200) have the authentication device identifiers "AUTH_a", "AUTH_c", and "AUTH_d".

The use-permitted authentication device table 1400 performs management in association with the version or issuance date and time of the authentication device list table 1300 to be used. The use-permitted authentication device table 1400 illustrated in the example of FIG. 14 is associated with the authentication device list table 1300 of version 1.0.

Second Exemplary Embodiment

Figure 15:
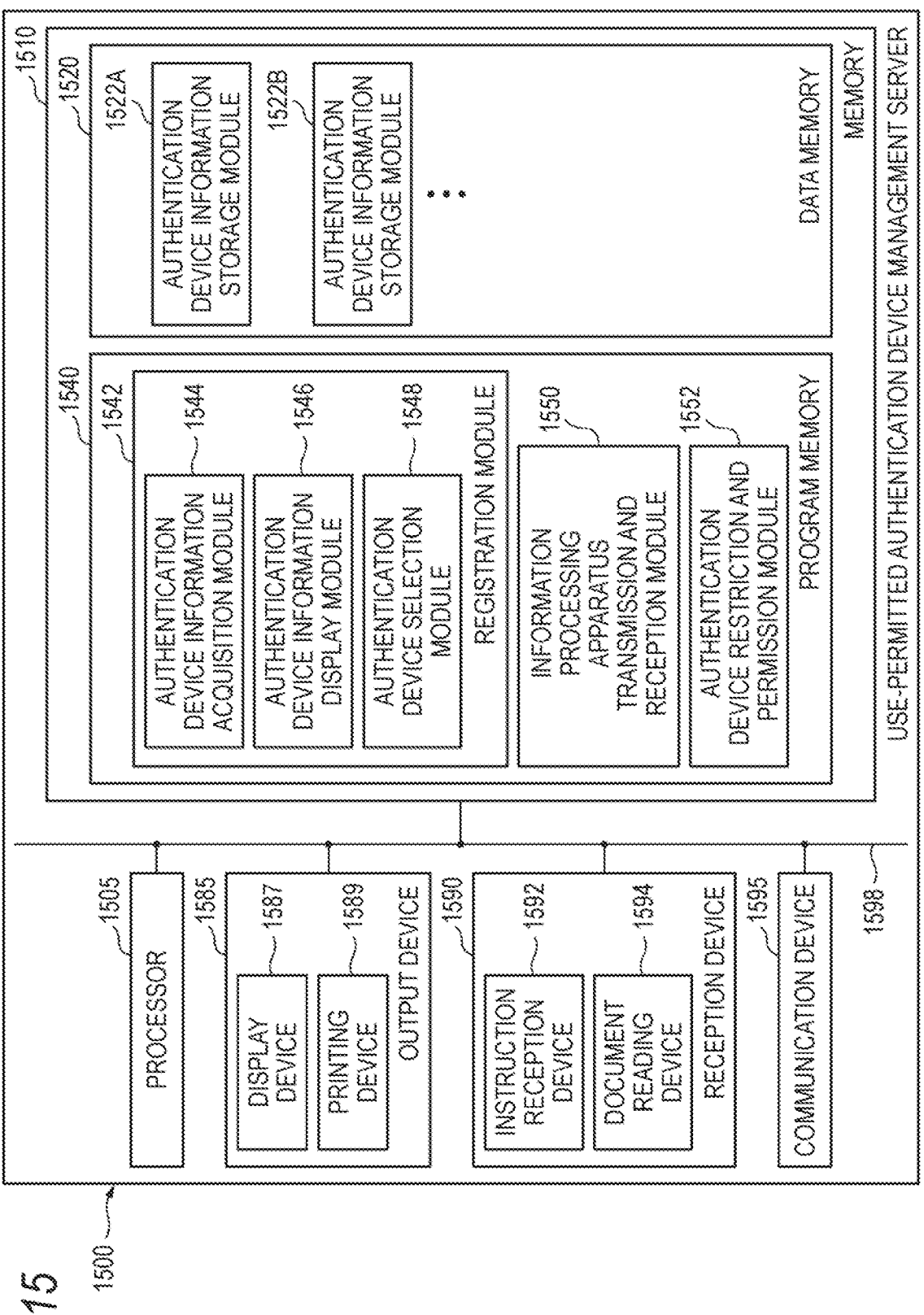
FIG. 15 is a conceptual module configuration diagram illustrating a configuration example according to a second exemplary embodiment (use-permitted authentication device management server)

FIG. 15 is a conceptual module configuration diagram illustrating a configuration example according to a second exemplary embodiment (use-permitted authentication device management server 1500).

In the first exemplary embodiment, as illustrated in the example of FIG. 2, the administrator 255 of each image processing apparatus 200 sets the authentication device 210 that is permitted to be used by the image processing apparatus 200.

However, for example, there may be a case where plural image processing apparatuses 1600 are operated in a company, and one administrator 255 sets the plural image processing apparatuses 1600. For this reason, in the second exemplary embodiment, one administrator 255 may set the plural image processing apparatuses 1600 by the use-permitted authentication device management server 1500. Specifically, use-permitted authentication device tables 1400 in relation to the plural image processing apparatuses 1600 are shared such that setting and management of the authentication devices 210 permitted to be used in each of the image processing apparatuses 1600 may be performed. Each image processing apparatus 1600 is an information processing apparatus that functions as a FIDO client.

The use-permitted authentication device management server 1500 includes a processor 1505, a memory 1510, an output device 1585, a reception device 1590, and a communication device 1595. The processor 1505, the output device 1585, the reception device 1590, and the communication device 1595 are the same as the processor 105, the output device 185, the reception device 190, and the communication device 195 illustrated in the example of FIG. 1, respectively. The communication device 1595 is a communication line interface such as a network card for connecting to other devices (the RP server 270, the MDS server 280, and the image processing device 1600) via a communication line.

The memory 1510 includes a data memory 1520 and a program memory 1540, and is connected to the processor 1505, the output device 1585, the reception device 1590, and the communication device 1595 via a bus 1598.

The data memory 1520 stores one or more authentication device information storage modules 1522 (for example, an authentication device information storage module 1522A, an authentication device information storage module 1522B, and the like). In a case where the authentication device 210 permitted to be used are the same in all the image processing apparatuses 1600, one authentication device information storage module 1522 may be used. In a case where there are different groups of authentication devices 210 permitted to be used, a number equal to the different groups of authentication device information storage modules 1522 are required. In a case where the authentication devices 210 permitted to be used by each image processing apparatus 1600 are different from each other, the authentication device information storage module 1522 is required for each image processing apparatus 1600.

The authentication device information storage module 1522 stores authentication device information indicating authentication devices 210 usable during FIDO authentication using the image processing apparatus 1600 in association with the image processing apparatus 1600, and is equivalent to the authentication device information storage module 122 illustrated in the example of FIG. 1. Note that "storing in association with the image processing apparatus 1600" indicates that each image processing apparatus 1600 and the authentication device information storage module 1522 are associated with each other. When there are N target image processing apparatuses 1600, as described above, in the case where the authentication devices 210 permitted to be used are the same in all the image processing apparatuses 1600, one authentication device information storage module 1522 is sufficient, and the number of the image processing apparatuses 1600 and the number of the authentication device information storage modules 1522 have a relationship of N to 1. In the case where there are different groups of authentication devices 210 permitted to be used, a number equal to the different groups (M, M<=N) of authentication device information storage modules 1522 are required, and the number of the image processing apparatuses 1600 and the number of the authentication device information storage modules 1522 have a relationship of N to M. In the case where the authentication devices 210 permitted to be used by each image processing apparatus 1600 are different from each other, the authentication device information storage module 1522 is required for each image processing apparatus 1600, and the number of image processing apparatuses 1600 and the number of the authentication device information storage modules 1522 have a relationship of N to N.

Each authentication device information storage module 1522 has a data structure equivalent to that of the use-permitted authentication device table 1400 illustrated in the example of FIG. 14. The use-permitted authentication device table 1400 is stored corresponding to each image processing apparatus 1600. The use-permitted authentication device table 1400 may include a column of an identifier of the image processing apparatus 1600 in addition to the authentication device identifier column 1410. That is, the identifier of the image processing apparatus 1600 and the identifier of the authentication device 210 may be stored in association with each other, and the identifier of the authentication device 210 permitted to be used by the image processing apparatus 1600 may be retrieved based on the identifier of the image processing apparatus 1600, or conversely, the identifier of the image processing apparatus 1600 that permits the use of the authentication device 210 may be retrieved based on the identifier of the authentication device 210.

The program memory 1540 stores a registration module 1542, an information processing apparatus transmission and reception module 1550, and an authentication device restriction and permission module 1552.

The registration module 1542 includes an authentication device information acquisition module 1544, an authentication device information display module 1546, and an authentication device selection module 1548.

The authentication device information acquisition module 1544 acquires authentication device information from the authentication device information management server (MDS server 280).

The authentication device information display module 1546 displays the authentication device information acquired by the authentication device information acquisition module 1544 to the administrator.

The authentication device selection module 1548 causes the authentication device information storage module 1522 corresponding to the image processing apparatus 1600 to store the authentication device information indicating the authentication device 210 that is selected by the administrator and connectable to each image processing apparatus 1600.

When there is an authentication start request from a user during FIDO authentication, the image processing apparatus 1600 transmits authentication device information indicating the authentication device 210 used by the user to the use-permitted authentication device management server 1500.

The information processing apparatus transmission and reception module 1550 communicates with the image processing apparatus 1600 via the communication apparatus 1595. For example, the information processing apparatus transmission and reception module 1550 receives the authentication device information transmitted from the image processing apparatus 1600. Then a result of determination by the authentication device restriction and permission module 1552 is returned to the image processing apparatus 1600.

The authentication device restriction and permission module 1552 determines whether the authentication device information transmitted from the image processing apparatus 1600 is included in the authentication device information stored in the authentication device information storage module 1522 corresponding to the image processing apparatus 1600, and controls the information processing apparatus transmission and reception module 1550 to transmit information indicating a result of the determination to the image processing apparatus 1600.

When the information transmitted from the use-permitted authentication device management server 1500 is information indicating that the authentication device information transmitted by the image processing apparatus 1600 is not included in the authentication device information stored in the authentication device information storage module 1522 of the image processing apparatus 1600, the image processing apparatus 1600 restricts use of the authentication device 210.

Figure 16:
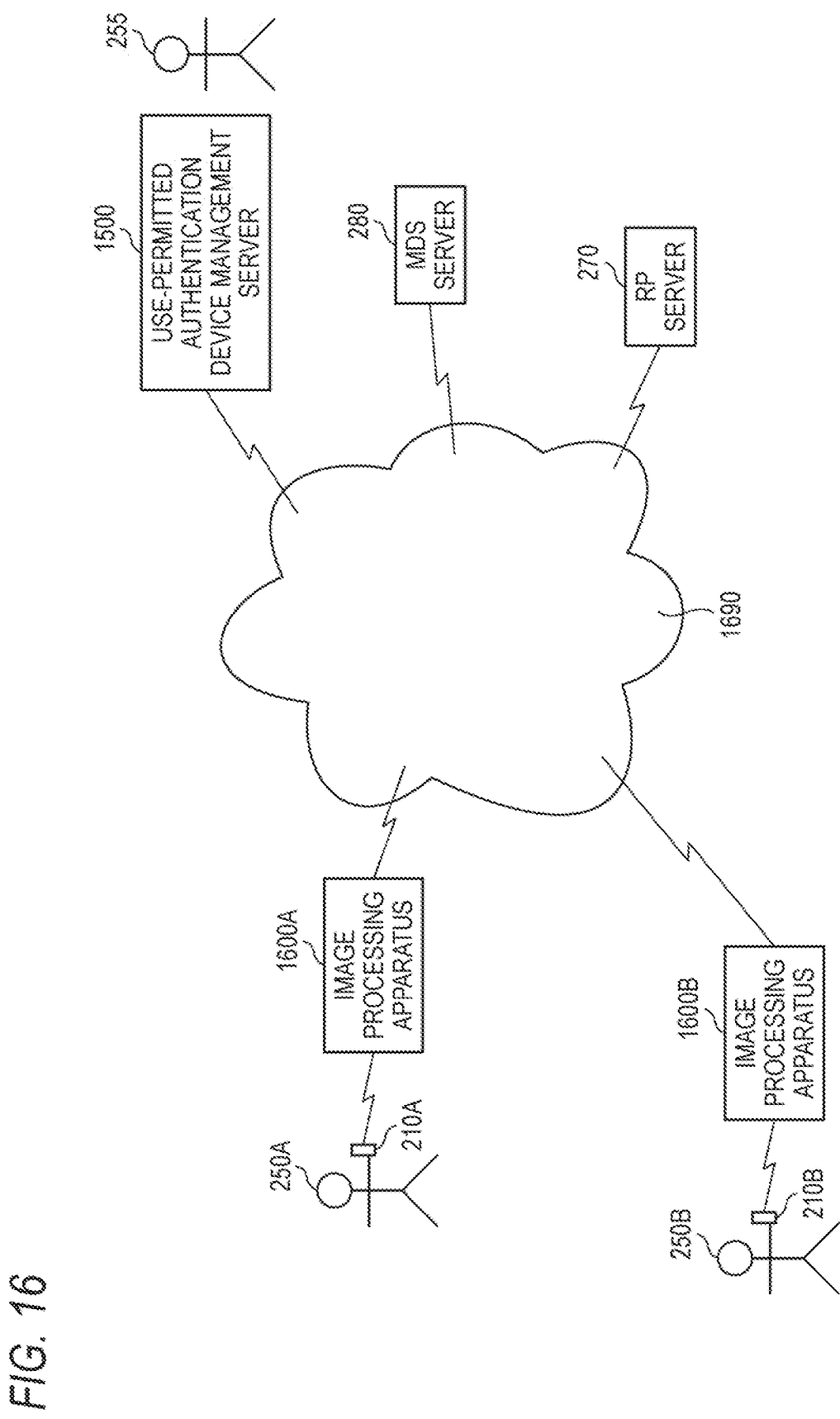
FIG. 16 is an explanatory diagram illustrating a system configuration example using the second exemplary embodiment.

FIG. 16 is an explanatory diagram illustrating a system configuration example using the second exemplary embodiment.

The use-permitted authentication device management server 1500, an image processing apparatus 1600A, an image processing apparatus 1600B, the RP server 270, and the MDS server 280 are connected to each other via a communication line 1690. The communication line 1690 may be wireless, wired, or a combination thereof, and may be, for example, the Internet, an intranet, or the like as a communication infrastructure. Functions of the use-permitted authentication device management server 1500, the RP server 270, and the MDS server 280 may be implemented as a cloud service.

The use-permitted authentication device management server 1500 is used by the administrator 255.

The image processing apparatus 1600 (the image processing apparatus 1600A and the image processing apparatus 1600B) is a multifunction device that is used by the user 250 and has a function of a FIDO client during FIDO authentication.

The image processing apparatus 1600A is used by a user 250A.

The user 250A carries an authentication device 210A. The image processing apparatus 1600A and the authentication device 210A are connected to each other via a communication line.

The image processing apparatus 1600B is used by the user 250B.

The user 250B carries an authentication device 210B. The image processing apparatus 1600B and the authentication device 210B are connected to each other via a communication line.

The administrator 255 operates the use-permitted authentication device management server 1500 to perform setting for restricting the authentication devices 210 to be used in the FIDO authentication by each image processing apparatus 1600. At this time, communication with the MDS server 280 is performed.

Thereafter, when the user 250 uses the authentication device 210 to use the FIDO authentication, the image processing apparatus 1600 requests the use-permitted authentication device management server 1500 to determine whether the authentication device 210 is the authentication device 210 permitted by the administrator 255, and performs control in such a manner that the FIDO authentication using the RP server 270 is able to be used if a reply from the use-permitted authentication device management server 1500 is "permitted authentication device 210", and the FIDO authentication cannot be used if the reply from the use-permitted authentication device management server 1500 is "non-permitted authentication device 210".

Figure 17:
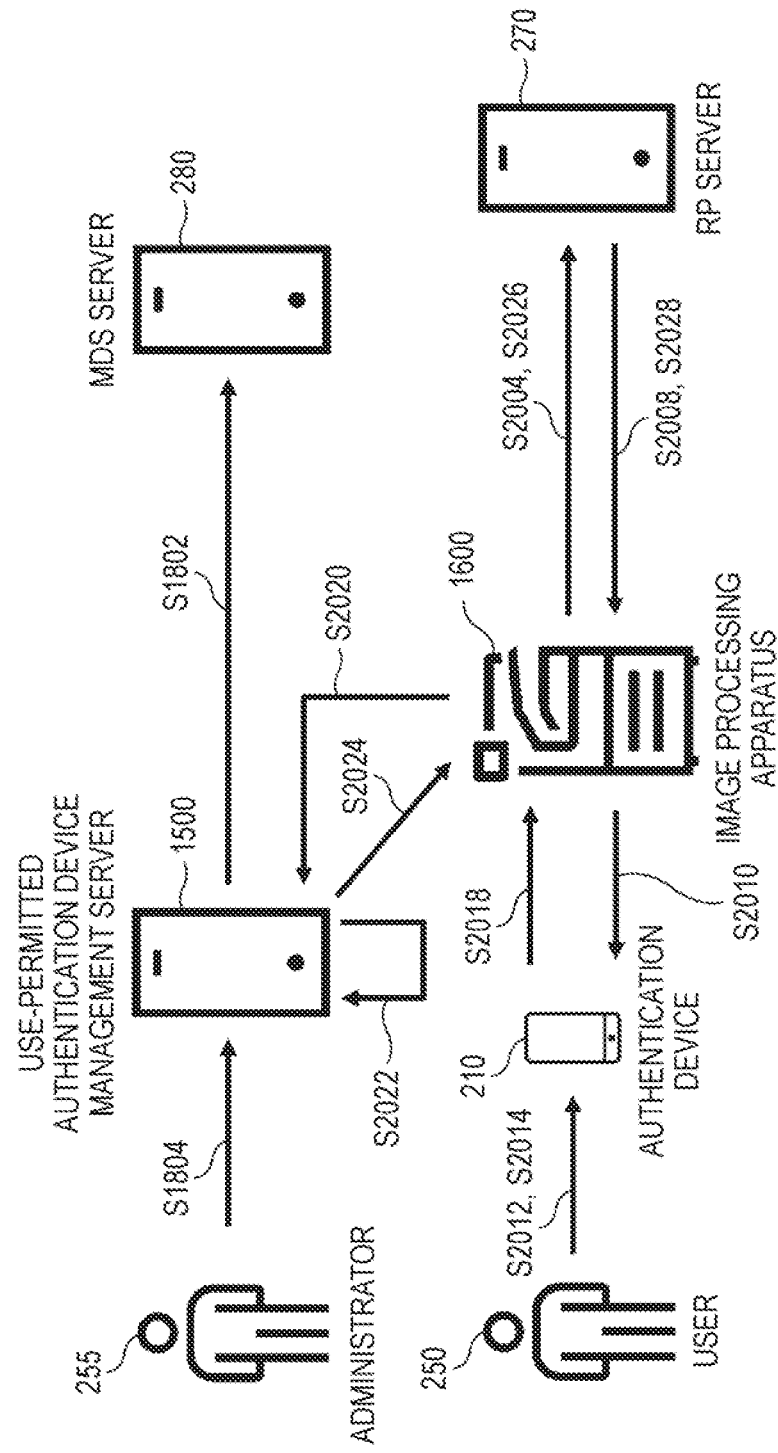
FIG. 17 is an explanatory diagram illustrating a process example according to the second exemplary embodiment.
Figure 18:
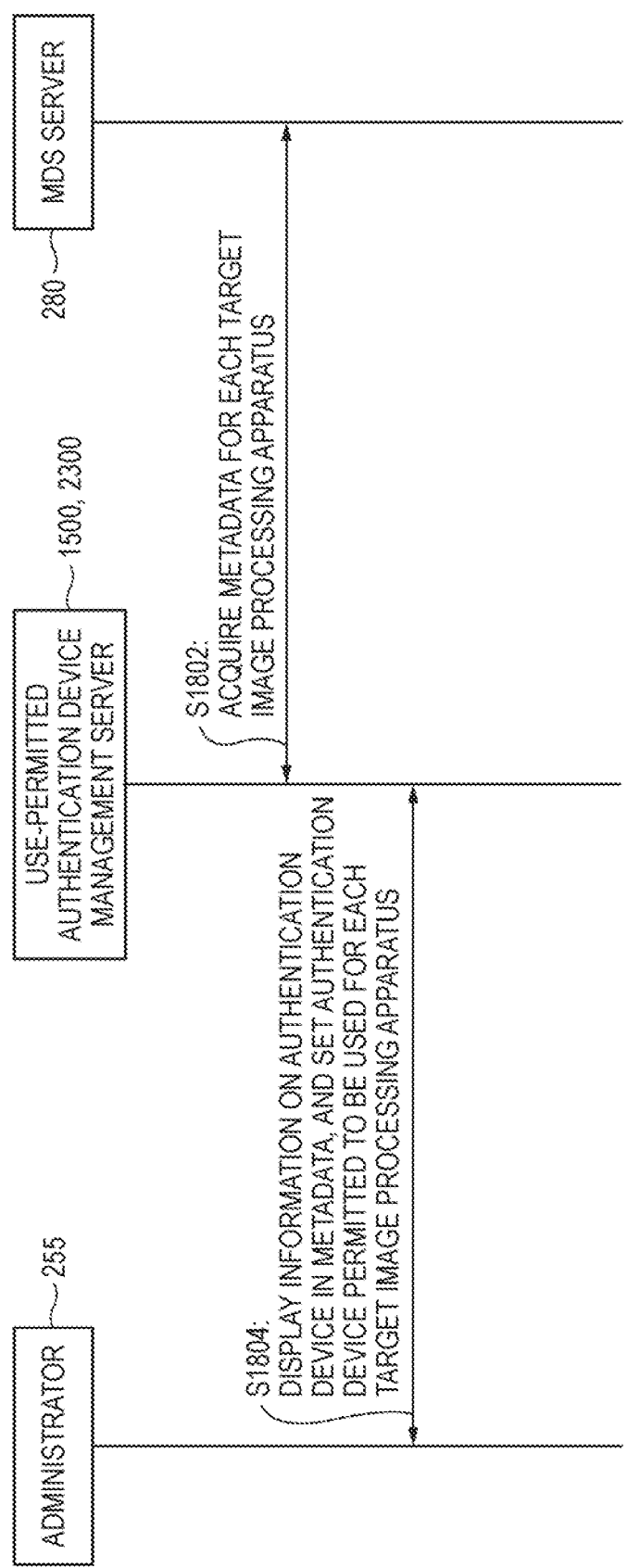
FIG. 18 is a flowchart illustrating a process example according to the second exemplary embodiment or a third exemplary embodiment.

A process example (registration process example) according to the second exemplary embodiment will be described with reference to FIGS. 17 and 18. FIG. 17 is an explanatory diagram illustrating a process example according to the second exemplary embodiment. FIG. 18 is a flowchart illustrating the process example according to the second exemplary embodiment.

In step S1802, the use-permitted authentication device management server 1500 acquires metadata from the MDS server 280.

In step S1804, the use-permitted authentication device management server 1500 displays information on the authentication device 210 in the metadata to the administrator 255, and sets the authentication device 210 permitted to be used for each target image processing apparatus 1600 in response to an operation of the administrator 255. That is, the authentication device information indicating the authentication device 210 connectable to the target image processing apparatus 1600 is stored in the authentication device information storage module 1522.

The registration process example illustrated in the example of FIG. 17 will be described in more detail with reference to a flowchart illustrated in an example of FIG. 19.

Figure 19:
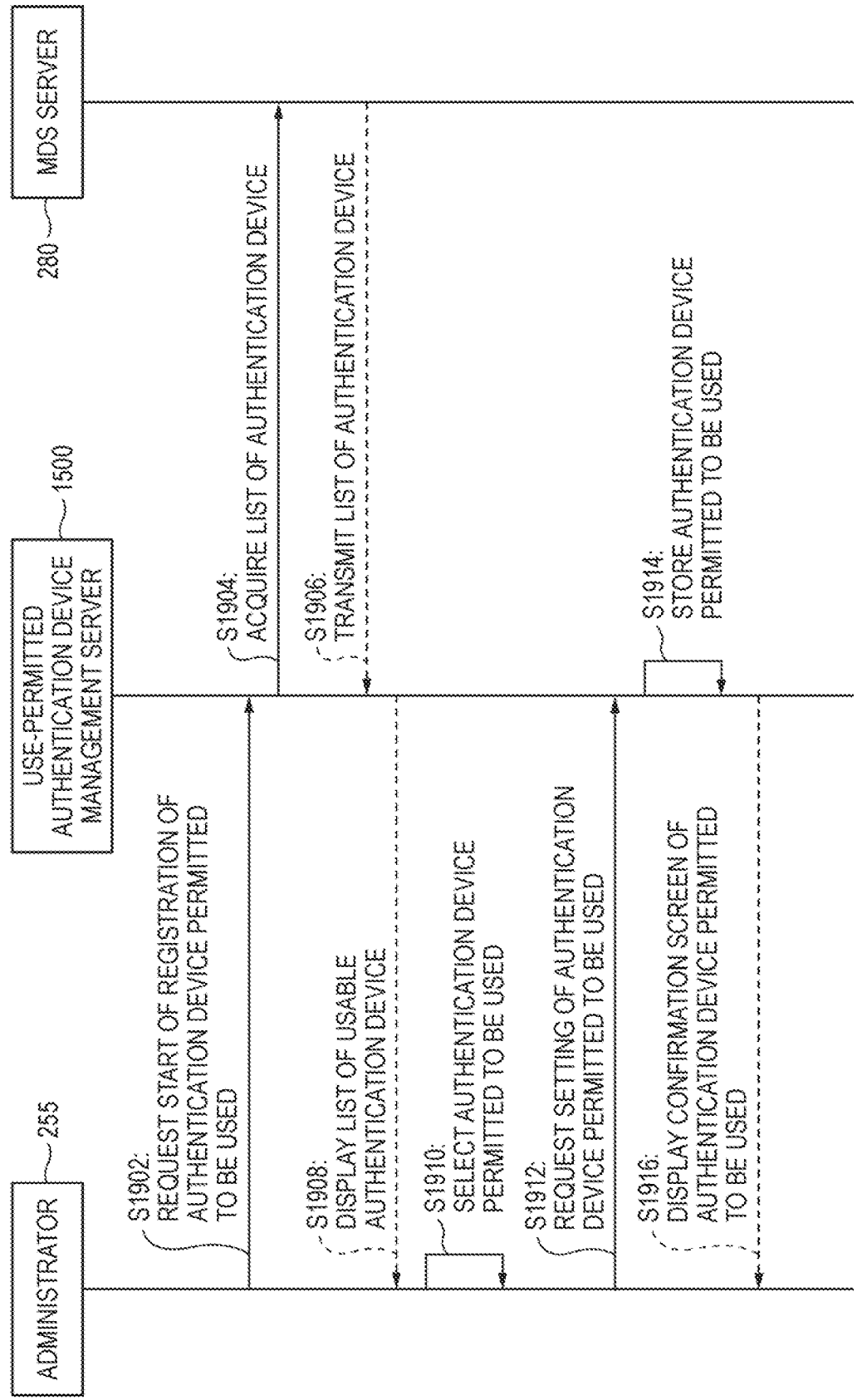
FIG. 19 is a flowchart illustrating a process example according to the second exemplary embodiment.

FIG. 19 is a flowchart illustrating the process example (the registration process example) according to the second exemplary embodiment.

In step S1902, the administrator 255 requests the use-permitted authentication device management server 1500 to start registration of an authentication device permitted to be used by the target image processing apparatus 1600.

In step S1904, the use-permitted authentication device management server 1500 requests the MDS server 280 to acquire a list of authentication devices (metadata).

In step S1906, the MDS server 280 transmits the list of authentication devices to the use-permitted authentication device management server 1500.

In step S1908, the use-permitted authentication device management server 1500 displays a list of usable authentication devices to the administrator 255.

In step S1910, the administrator 255 selects an authentication device that is permitted to be used by the target image processing apparatus 1600.

In step S1912, the administrator 255 requests the use-permitted authentication device management server 1500 to set the authentication device permitted to be used.

In step S1914, the use-permitted authentication device management server 1500 stores the authentication device permitted to be used in the authentication device information storage module 1522 corresponding to the target image processing apparatus 1600.

After step S1914, a version of an authentication device list may be stored.

In step S1916, the use-permitted authentication device management server 1500 displays a confirmation screen of the authentication device permitted to be used to the administrator 255.

The process example (authentication process example) according to the second exemplary embodiment will be described with reference to FIGS. 17 and 20. FIG. 20 is a flowchart illustrating the process example according to the second exemplary embodiment.

In step S2002, the user 250 requests the image processing apparatus 1600 to start authentication by FIDO authentication.

In step S2004, the image processing apparatus 1600 requests the RP server 270 for an authentication parameter.

In step S2006, the RP server 270 generates the authentication parameter. The authentication parameter here corresponds to the challenge described above.

In step S2008, the RP server 270 transmits the authentication parameter to the image processing apparatus 1600.

In step S2010, the image processing apparatus 1600 requests the authentication device 210 to generate an assertion.

In step S2012, the authentication device 210 requests the user 250 to perform user authentication.

In step S2014, the user 250 uses the authentication device 210 to perform the user authentication. Specifically, as described above, a fingerprint, a face, or the like, which is biometric information of the user 250, is read by the authentication device 210 to perform biometric authentication by the authentication device 210.

In step S2016, when the biometric authentication is successful, the authentication device 210 generates the assertion. Of course, when the biometric authentication is not successful, the authentication device 210 does not generate the assertion, and the assertion generation thus fails.

In step S2018, the authentication device 210 transmits the assertion to the image processing apparatus 1600.

In step S2020, the image processing apparatus 1600 requests the use-permitted authentication device management server 1500 to determine whether the authentication device 210 can be used in the image processing apparatus 1600.

In step S2022, the use-permitted authentication device management server 1500 determines whether the authentication device 210 can be used in the target image processing apparatus 1600. In step S1914 in the flowchart illustrated in the example of FIG. 19, the authentication device information stored in the authentication device information storage module 1522 is used. That is, it is determined whether the target authentication device 210 coincides with the authentication device indicated by the authentication device information stored in the authentication device information storage module 1522. If coincides, it is determined that the use of the authentication device 210 is permitted, and if does not coincide, it is determined that the use of the authentication device 210 is not permitted.

In step S2024, the use-permitted authentication device management server 1500 transmits, to the image processing apparatus 1600, a result of the determination in step S2022 of whether the authentication device 210 can be used.

In step S2026, the image processing apparatus 1600 transmits the assertion to the RP server 270. More specifically, when the biometric authentication is successful in step S2014 and the determination result that the use of the authentication device 210 is permitted is received in step S2024, the assertion received in step S2018 is directly transmitted to the RP server 270. When the biometric authentication fails in step S2014, or when the determination result that the use of the authentication device 210 is not permitted is received in step S2024, information indicating that the assertion generation has failed is transmitted to the RP server 270.

In step S2028, the RP server 270 transmits an authentication result to the image processing apparatus 1600. When the assertion is received, authentication is performed by using the authentication parameter generated in step S2006 and the assertion received in step S2026, and the authentication result is transmitted to the image processing apparatus 1600. When the information indicating that the assertion generation has failed is received, nothing may be performed, or information indicating a failure may be transmitted as the authentication result to the image processing apparatus 1600.

Figure 21:
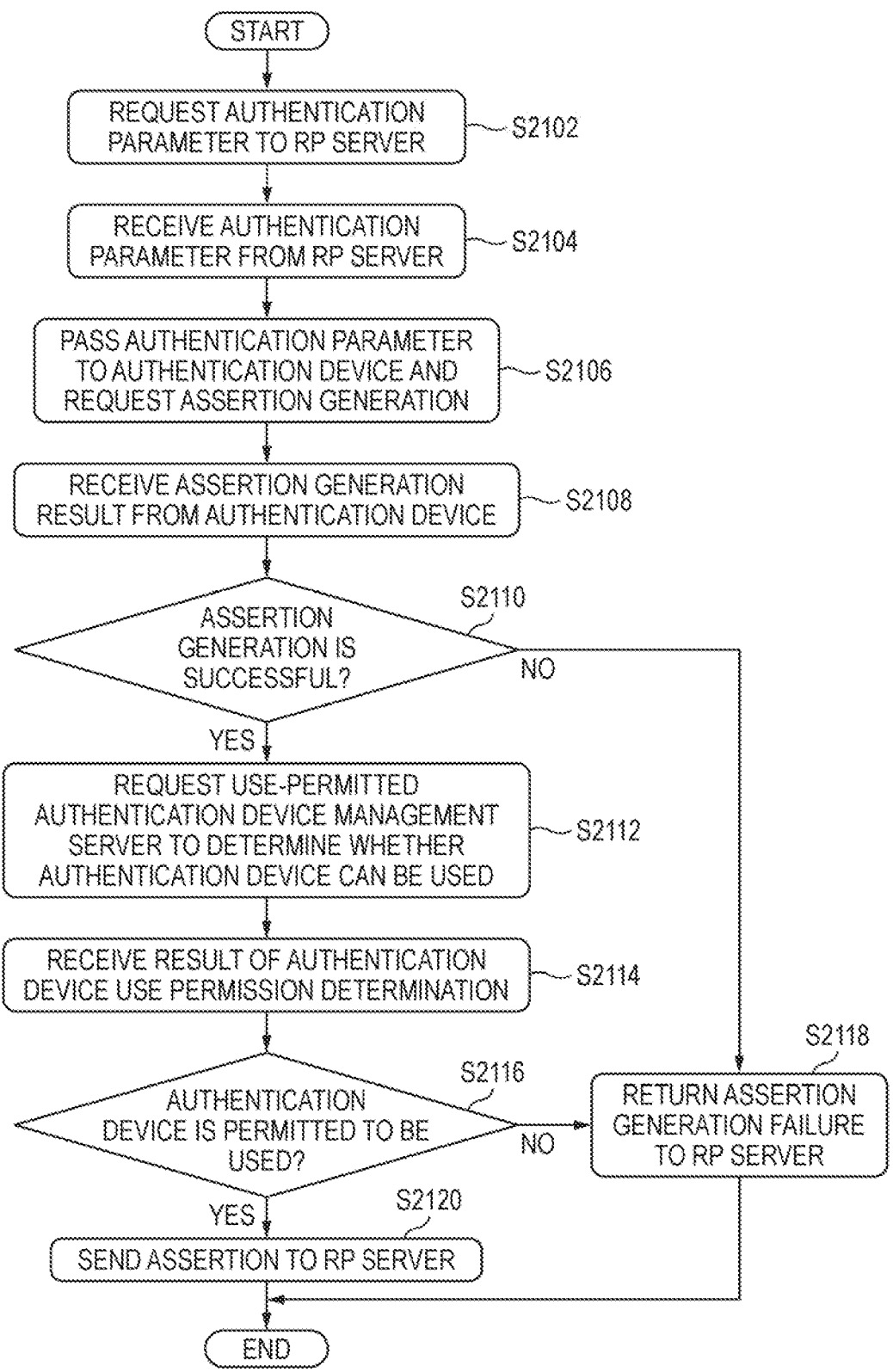
FIG. 21 is a flowchart illustrating a process example according to the second exemplary embodiment.

FIG. 21 is a flowchart illustrating a process example (an authentication process example) according to the second exemplary embodiment (the image processing apparatus 1600).

In step S2102, an authentication parameter is requested to the RP server 270.

In step S2104, the authentication parameter is received from the RP server 270.

In step S2106, the authentication parameter is passed to the authentication device 210 and assertion generation is requested.

In step S2108, an assertion generation result is received from the authentication device 210.

In step S2110, it is determined whether the assertion generation is successful. If successful, the process proceeds to step S2112. Otherwise, the process proceeds to step S2118.

In step S2112, the use-permitted authentication device management server 1500 is requested to determine whether the authentication device can be used.

In step S2114, a result of the authentication device use permission determination is received.

In step S2116, it is determined whether the authentication device is permitted to be used. If permitted, the process proceeds to step S2120. Otherwise, the process proceeds to step S2118.

In step S2118, an assertion generation failure is returned to the RP server 270.

In step S2120, the assertion is sent to the RP server 270.

Third Exemplary Embodiment

A third exemplary embodiment is a modification of the second exemplary embodiment. In the second exemplary embodiment, the use-permitted authentication device management server 1500 determines whether the authentication device 210 can be used in each image processing apparatus 1600. However, in the third exemplary embodiment, a use-permitted authentication device management server 2300 stores the use-permitted authentication device table 1400 in each image processing apparatus 2200 (this point is the same as in the second exemplary embodiment), and the determination is performed by each image processing apparatus 2200.

Figure 22:
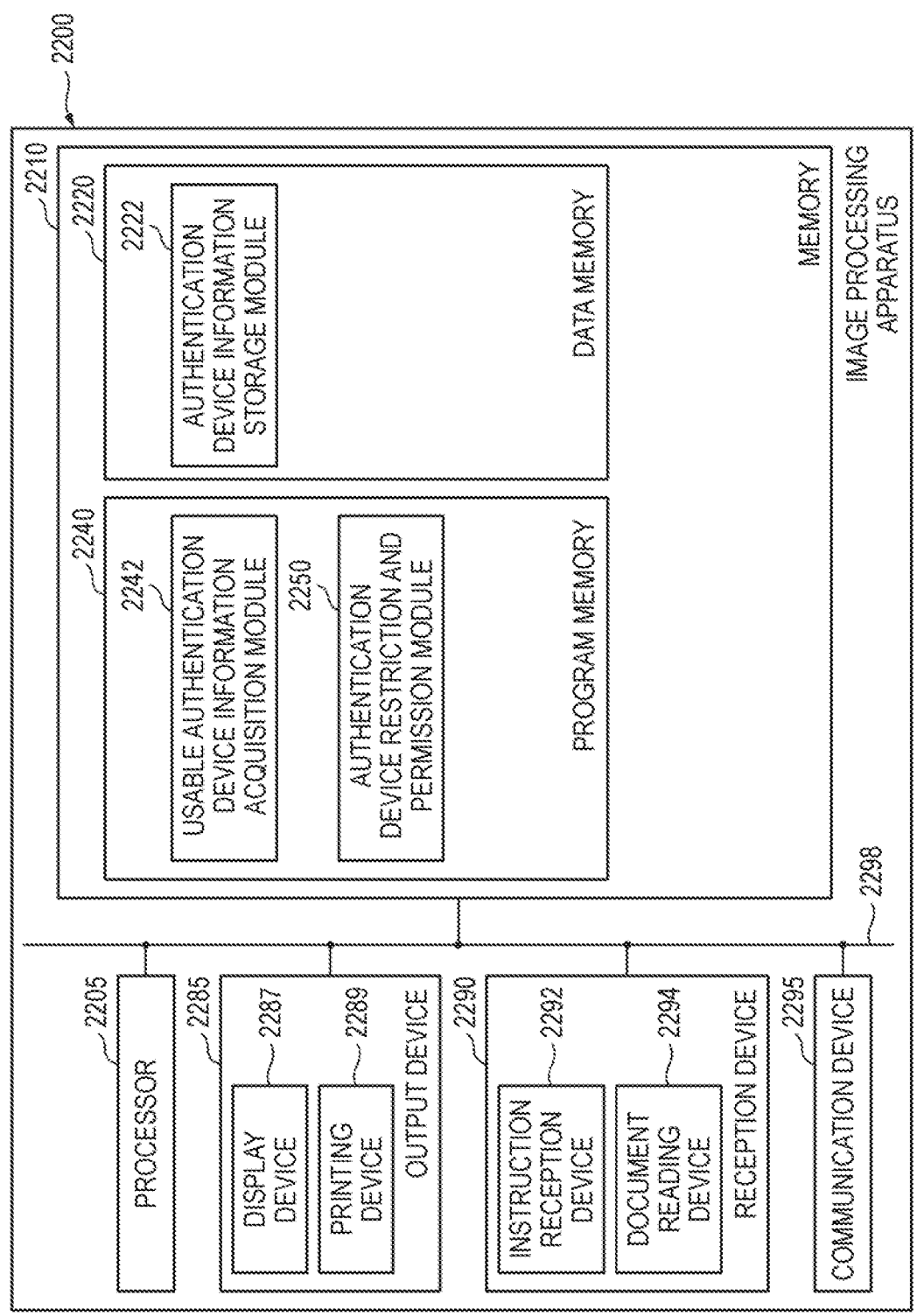
FIG. 22 is a conceptual module configuration diagram illustrating a configuration example according to the third exemplary embodiment (image processing apparatus)

FIG. 22 is a conceptual module configuration diagram illustrating a configuration example according to the third exemplary embodiment (image processing apparatus 2200).

The image processing apparatus 2200 includes a processor 2205, a memory 2210, an output device 2285, a reception device 2290, and a communication device 2295. The processor 2205, the output device 2285, the reception device 2290, and the communication device 2295 are equivalent to the processor 105, the output device 185, the reception device 190, and the communication device 195 illustrated in the example of FIG. 1, respectively. The communication device 2295 is a communication line interface such as a network card for connecting to other devices (the authentication device 210, the RP server 270, and the use-permitted authentication device management server 2300) via a communication line.

The memory 2210 includes a data memory 2220 and a program memory 2240, and is connected to the processor 2205, the output device 2285, the reception device 2290, and the communication device 2295 via a bus 2298.

The data memory 2220 stores an authentication device information storage module 2222.

The authentication device information storage module 2222 stores authentication device information indicating the authentication device 210 usable in FIDO authentication. The authentication device information is acquired from the use-permitted authentication device management server 2300. The authentication device information storage module 2222 has a function equivalent to that of the authentication device information storage module 122 in the first exemplary embodiment.

The program memory 2240 stores a usable authentication device information acquisition module 2242 and an authentication device restriction and permission module 2250.

When there is an authentication start request from a user during FIDO authentication, the usable authentication device information acquisition module 2242 transmits a request for acquiring authentication device information indicating the authentication device 210 usable in the FIDO authentication using the information processing apparatus 2200 to the use-permitted authentication device management server 2300.

Then the usable authentication device information acquisition module 2242 acquires the authentication device information indicating the authentication device 210 usable in the FIDO authentication using the image processing device 2200 from the use-permitted authentication device management server 2300, and stores the authentication device information in the authentication device information storage module 2222.

When the authentication device information (authentication device information stored in the authentication device information storage module 2222) transmitted from the use-permitted authentication device management server 2300 does not include authentication device information indicating the authentication device 210 used by the user, the authentication device restriction and permission module 2250 restricts use of the authentication device 210. The authentication device restriction and permission module 2250 has a function equivalent to that of the authentication device restriction and permission module 150 in the first exemplary embodiment.

Figure 23:
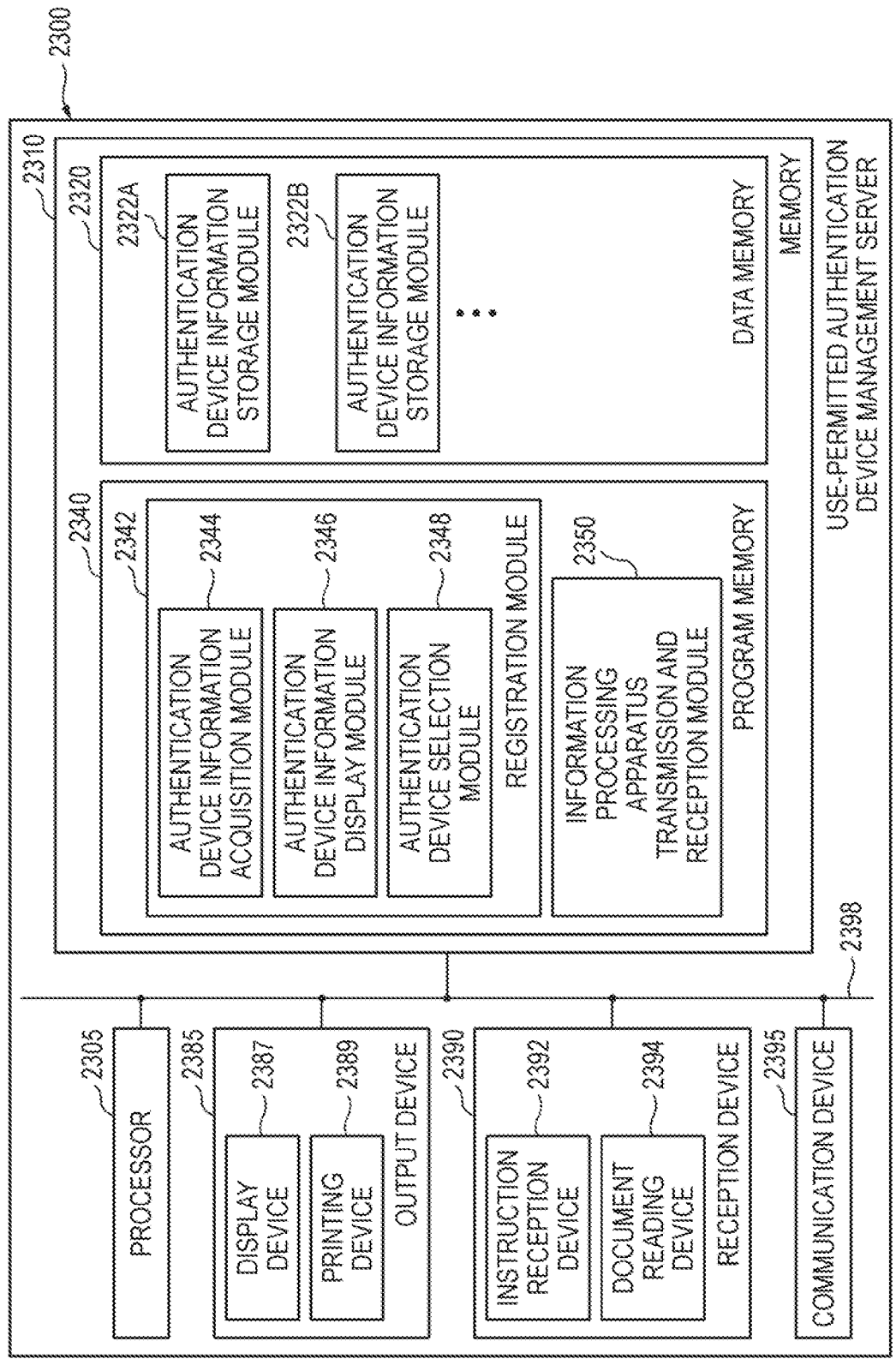
FIG. 23 is a conceptual module configuration diagram illustrating a configuration example according to the third exemplary embodiment (use-permitted authentication device management server)

FIG. 23 is a conceptual module configuration diagram illustrating a configuration example according to the third exemplary embodiment (use-permitted authentication device management server 2300).

The use-permitted authentication device management server 2300 includes a processor 2305, a memory 2310, an output device 2385, a reception device 2390, and a communication device 2395. The processor 2305, the output device 2385, the reception device 2390, and the communication device 2395 are equivalent to the processor 105, the output device 185, the reception device 190, and the communication device 195 illustrated in the example of FIG. 1, respectively. The communication device 2395 is a communication line interface such as a network card for connecting to other devices (the MDS server 280 and the image processing device 2200) via a communication line.

The memory 2310 includes a data memory 2320 and a program memory 2340, and is connected to the processor 2305, the output device 2385, the reception device 2390, and the communication device 2395 via a bus 2398.

The data memory 2320 stores an authentication device information storage module 2322A, an authentication device information storage module 2322B, and the like.

The authentication device information storage module 2322 stores authentication device information indicating authentication devices 210 usable during FIDO authentication using the image processing apparatus 2200 in association with the image processing apparatus 2200. The authentication device information storage module 2322 has a function equivalent to that of the authentication device information storage module 1522 in the second exemplary embodiment.

The program memory 2340 stores a registration module 2342 and an information processing apparatus transmission and reception module 2350.

The registration module 2342 includes an authentication device information acquisition module 2344, an authentication device information display module 2346, and an authentication device selection module 2348. The registration module 2342 has a function equivalent to that of the registration module 1542 in the second exemplary embodiment.

The authentication device information acquisition module 2344 acquires authentication device information from the authentication device information management server (MDS server 280).

The authentication device information display module 2346 displays the authentication device information acquired by the authentication device information acquisition module 2344 to the administrator.

The authentication device selection module 2348 causes the authentication device information storage module 2322 corresponding to the image processing apparatus 2200 to store the authentication device information indicating the authentication device 210 that is selected by the administrator and connectable to each image processing apparatus 2200.

The information processing apparatus transmission and reception module 2350 communicates with the image processing apparatus 2200 via the communication apparatus 2395. For example, "a request for acquiring authentication device information" transmitted from the image processing apparatus 2200 is received. In response to the request transmitted from the image processing apparatus 2200, the authentication device information indicating the authentication device 210 that can be used by the image processing apparatus 2200 is transmitted to the image processing apparatus 2200. That is, the authentication device information corresponding to the image processing apparatus 2200 that has made the request is returned to the image processing apparatus 2200.

Figure 24:
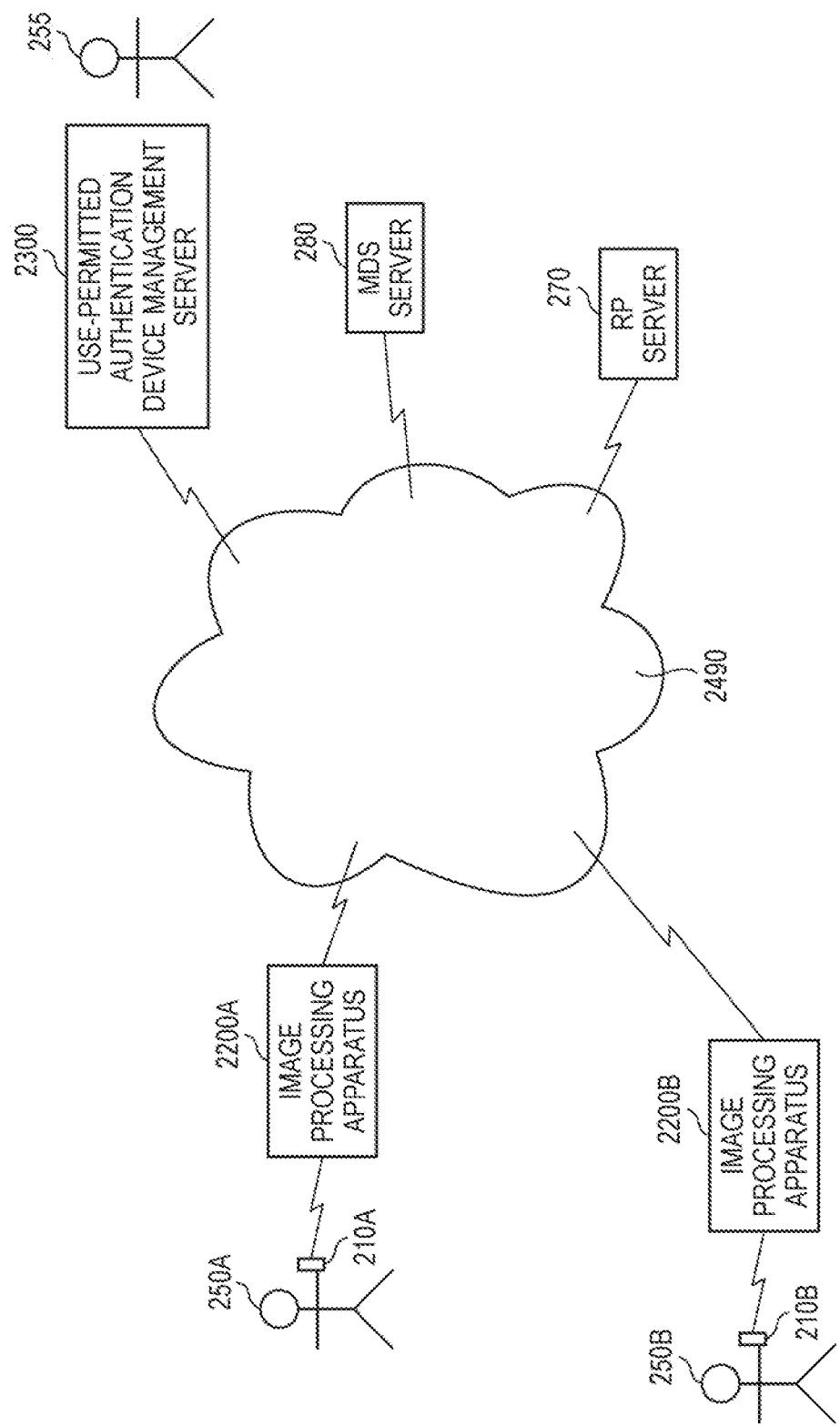
FIG. 24 is an explanatory diagram illustrating a system configuration example using the third exemplary embodiment.

FIG. 24 is an explanatory diagram illustrating a system configuration example using the third exemplary embodiment.

The use-permitted authentication device management server 2300, an image processing apparatus 2200A, an image processing apparatus 2200B, the RP server 270, and the MDS server 280 are connected to each other via a communication line 2490. The communication line 2490 may be wireless, wired, or a combination thereof, and may be, for example, the Internet, an intranet, or the like as a communication infrastructure. Functions of the use-permitted authentication device management server 2300, the RP server 270, and the MDS server 280 may be implemented as a cloud service.

The use-permitted authentication device management server 2300 is used by the administrator 255.

The image processing apparatus 2200 (the image processing apparatus 2200A and the image processing apparatus 2200B) is a multifunction device that is used by the user 250 and has a function of a FIDO client during FIDO authentication.

The image processing apparatus 2200A is used by the user 250A.

The user 250A carries an authentication device 210A. The image processing apparatus 2200A and the authentication device 210A are connected to each other via a communication line.

The image processing apparatus 2200B is used by the user 250B.

The user 250B carries an authentication device 210B. The image processing apparatus 2200B and the authentication device 210B are connected to each other via a communication line.

The administrator 255 operates the use-permitted authentication device management server 2300 to perform setting for restricting the authentication devices 210 to be used in the FIDO authentication by each image processing apparatus 2200. At this time, communication with the MDS server 280 is performed.

Thereafter, when the user 250 uses the authentication device 210 to use the FIDO authentication, the image processing apparatus 2200 acquires the authentication device information from the use-permitted authentication device management server 2300 when determining whether the authentication device 210 is the authentication device 210 permitted by the administrator 255. Then the image processing apparatus 2200 determines whether the authentication device 210 is the authentication device 210 permitted by the administrator 255, and performs control in such a manner that the FIDO authentication using the RP server 270 is able to be used if the authentication device 210 is permitted, and the FIDO authentication cannot be used if the authentication device 210 is not permitted.

Figure 25:
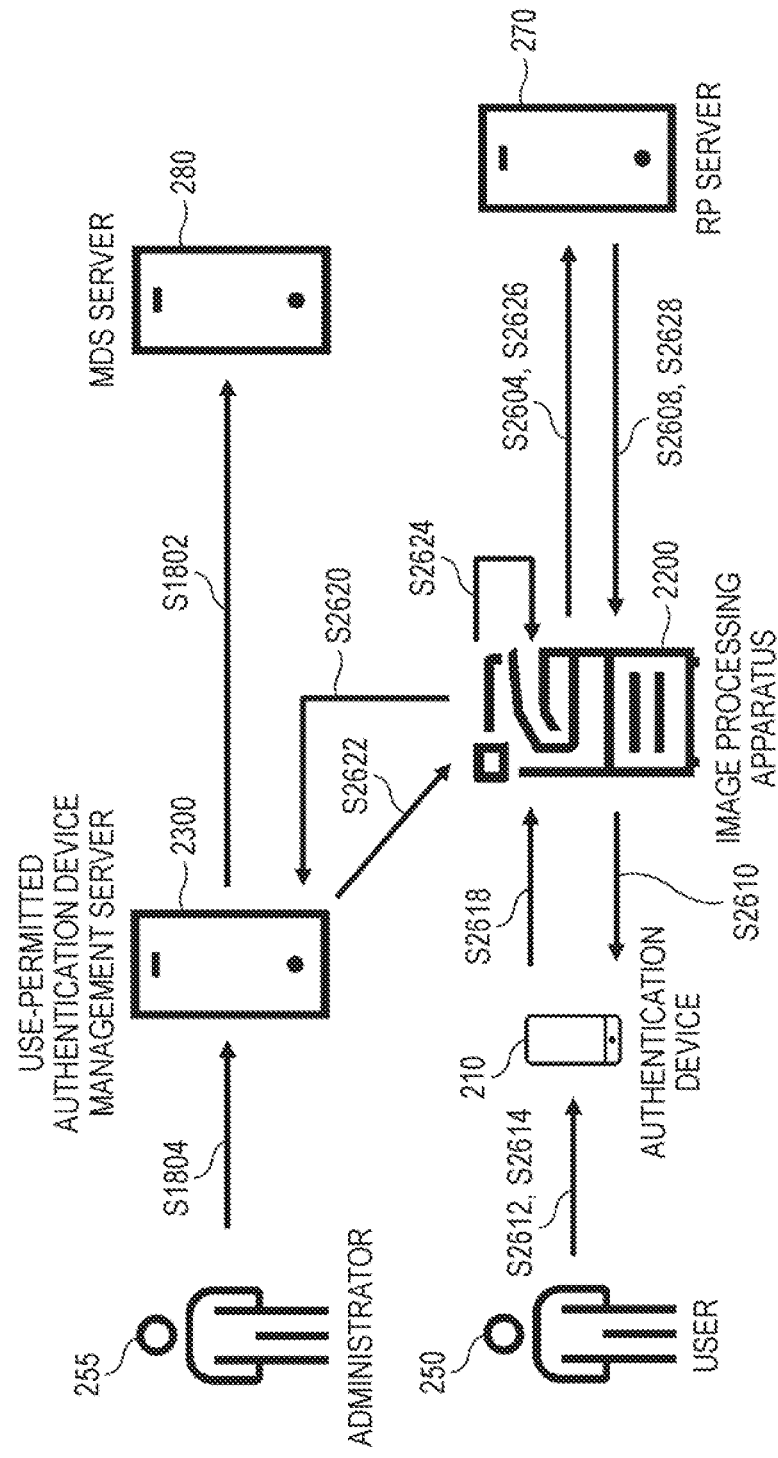
FIG. 25 is an explanatory diagram illustrating a process example according to the third exemplary embodiment.

A process example (registration process example) according to the third exemplary embodiment will be described with reference to FIGS. 25 and 18. FIG. 25 is an explanatory diagram illustrating a process example according to the third exemplary embodiment. FIG. 18 is a flowchart illustrating the process example according to the third exemplary embodiment.

In step S1802, the use-permitted authentication device management server 2300 acquires metadata from the MDS server 280.

In step S1804, the use-permitted authentication device management server 2300 displays information on the authentication device 210 in the metadata to the administrator 255, and sets the authentication device 210 permitted to be used for each target image processing apparatus 2200 in response to an operation of the administrator 255. That is, the authentication device information indicating the authentication device 210 connectable to the target image processing apparatus 2200 is stored in the authentication device information storage module 2322.

The process example (authentication process example) according to the third exemplary embodiment will be described with reference to FIGS. 25 and 26. FIG. 26 is a flowchart illustrating the process example according to the third exemplary embodiment.

In step S2602, the user 250 requests the image processing apparatus 2200 to start authentication by FIDO authentication.

In step S2604, the image processing apparatus 2200 requests the RP server 270 for an authentication parameter.

In step S2606, the RP server 270 generates the authentication parameter. The authentication parameter here corresponds to the challenge described above.

In step S2608, the RP server 270 transmits the authentication parameter to the image processing apparatus 2200.

In step S2610, the image processing apparatus 2200 requests the authentication device 210 to generate an assertion.

In step S2612, the authentication device 210 requests the user 250 to perform user authentication.

In step S2614, the user 250 uses the authentication device 210 to perform the user authentication. Specifically, as described above, a fingerprint, a face, or the like, which is biometric information of the user 250, is read by the authentication device 210 to perform biometric authentication by the authentication device 210.

In step S2616, when the biometric authentication is successful, the authentication device 210 generates the assertion. Of course, when the biometric authentication is not successful, the authentication device 210 does not generate the assertion, and the assertion generation thus fails.

In step S2618, the authentication device 210 transmits the assertion to the image processing apparatus 2200.

In step S2620, the image processing apparatus 2200 requests the use-permitted authentication device management server 2300 to acquire information on authentication devices permitted to be used by the image processing apparatus 2200.

In step S2622, the use-permitted authentication device management server 2300 transmits authentication device information corresponding to the image processing apparatus 2200 to the image processing apparatus 2200. The image processing device 2200 stores the received authentication device information in the authentication device information storage module 2222.

In step S2624, the image processing apparatus 2200 determines whether the authentication device 210 can be used. The authentication device information in the authentication device information storage module 2222 received in step S2622 is used. That is, it is determined whether the target authentication device 210 coincides with the authentication device indicated by the authentication device information stored in the authentication device information storage module 2222. If coincides, it is determined that the use of the authentication device 210 is permitted, and if does not coincide, it is determined that the use of the authentication device 210 is not permitted.

In step S2626, the image processing apparatus 2200 transmits the assertion to the RP server 270. More specifically, when the biometric authentication is successful in step S2614 and it is determined in step S2624 that the use of the authentication device 210 is permitted, the assertion received in step S2618 is directly transmitted to the RP server 270. When the biometric authentication fails in step S2614, or when it is determined in step S2624 that the use of the authentication device 210 is not permitted, information indicating that the assertion generation has failed is transmitted to the RP server 270.

In step S2628, the RP server 270 transmits an authentication result to the image processing apparatus 2200. When the assertion is received, authentication is performed by using the authentication parameter generated in step S2606 and the assertion received in step S2626, and the authentication result is transmitted to the image processing apparatus 2200. When the information indicating that the assertion generation has failed is received, nothing may be performed, or information indicating a failure may be transmitted as the authentication result to the image processing apparatus 2200.

Figure 27:
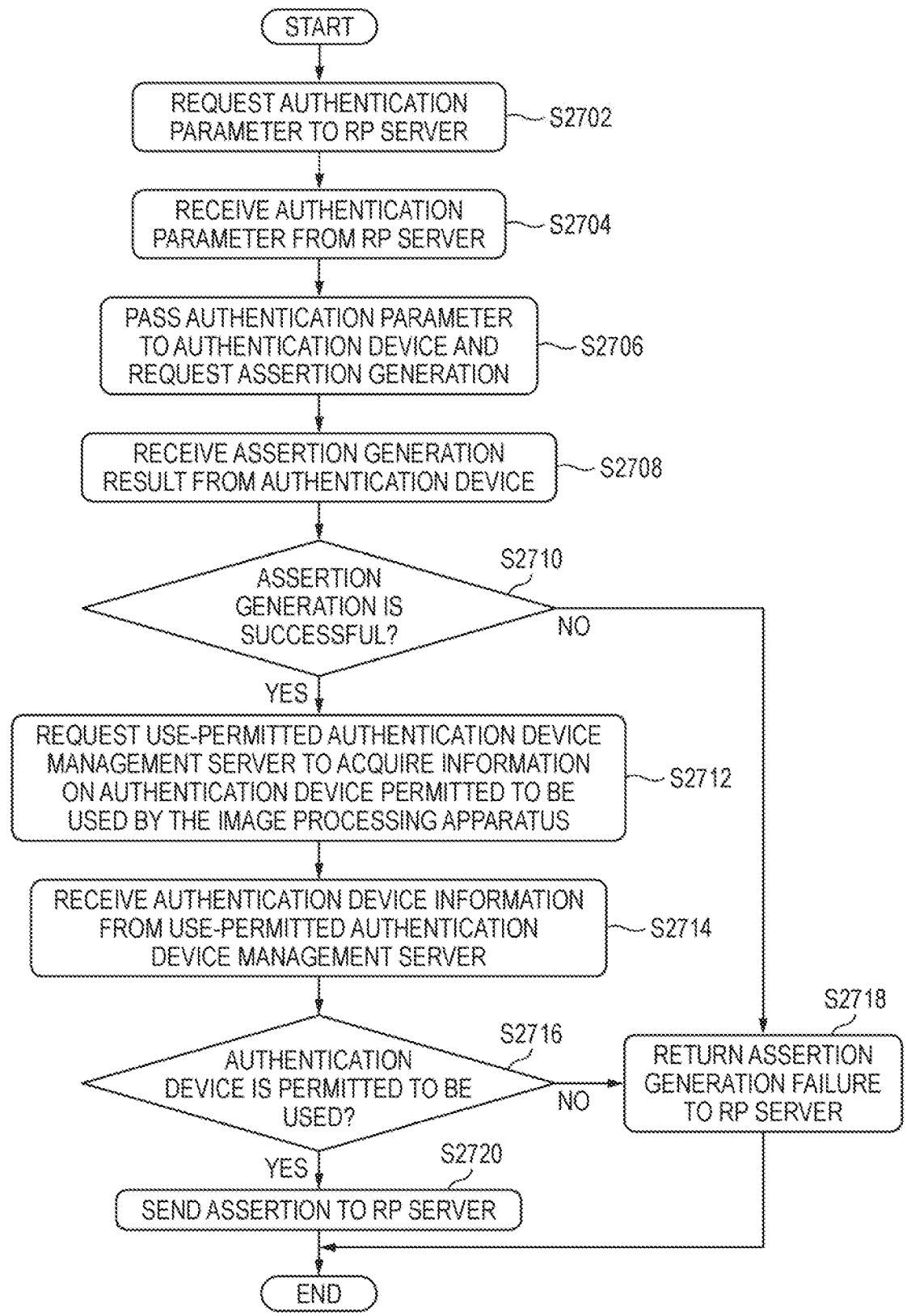
FIG. 27 is a flowchart illustrating a process example according to the third exemplary embodiment.

FIG. 27 is a flowchart illustrating a process example according to the third exemplary embodiment (image processing apparatus 2200).

In step S2702, an authentication parameter is requested to the RP server 270.

In step S2704, the authentication parameter is received from the RP server 270.

In step S2706, the authentication parameter is passed to the authentication device 210 and assertion generation is requested.

In step S2708, an assertion generation result is received from the authentication device 210.

In step S2710, it is determined whether the assertion generation is successful. If successful, the process proceeds to step S2712. Otherwise, the process proceeds to step S2718.

In step S2712, the use-permitted authentication device management server 2300 is requested to acquire information on authentication devices permitted to be used by the image processing apparatus 2200.

In step S2714, the authentication device information is received from the use-permitted authentication device management server 2300.

In step S2716, it is determined whether the authentication device 210 is permitted to be used. If permitted, the process proceeds to step S2720. Otherwise, the process proceeds to step S2718. Specifically, if the authentication device information received in step S2714 includes information indicating the target authentication device, "the authentication device is permitted to be used", and if not included, "the authentication device is not permitted to be used".

In step S2718, an assertion generation failure is returned to the RP server 270.

In step S2720, the assertion is sent to the RP server 270.

Fourth Exemplary Embodiment

A fourth exemplary embodiment is implemented in combination with the first exemplary embodiment, the second exemplary embodiment, or the third exemplary embodiment, and performs a process of updating authentication device information. In the following description, an example of a process performed between an image processing apparatus 2800 and an authentication device information management server 2850 will be described. When implemented in the first exemplary embodiment, the image processing apparatus 2800 may be replaced with the information processing apparatus 100 or the image processing apparatus 200, and the authentication device information management server 2850 may be replaced with the MDS server 280; when implemented in the second exemplary embodiment, the image processing apparatus 2800 may be replaced with the use-permitted authentication device management server 1500, and the authentication device information management server 2850 may be replaced with the MDS server 280; and when implemented in the third exemplary embodiment, the image processing apparatus 2800 may be replaced with the use-permitted authentication device management server 2300, and the authentication device information management server 2850 may be replaced with the MDS server 280.

Figure 28:
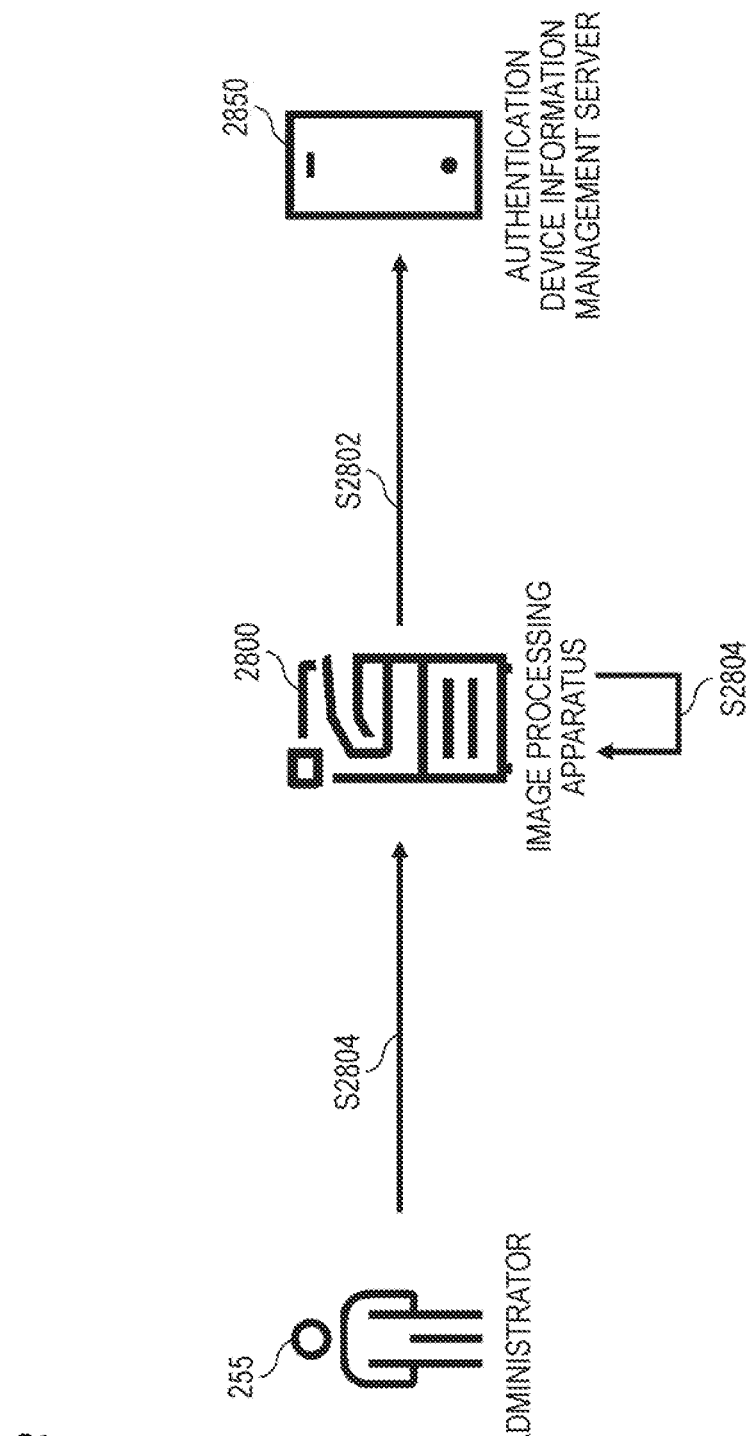
FIG. 28 is an explanatory diagram illustrating a process example according to a fourth exemplary embodiment.

FIG. 28 is an explanatory diagram illustrating a process example according to the fourth exemplary embodiment.

Authentication device information in the authentication device information management server 2850 is updated at certain timing. In the fourth exemplary embodiment, thereafter, a use-permitted authentication device table (the authentication device information storage module 122 in the information processing apparatus 100, the authentication device information storage module 1522 in the use-permitted authentication device management server 1500, and the authentication device information storage module 2322 in the use-permitted authentication device management server 2300, more specifically, the use-permitted authentication device table 1400 illustrated in the example of FIG. 14) in the image processing apparatus 2800 is updated. As a result, in each exemplary embodiment, latest authentication device information in the authentication device information management server 2850 may be followed. Therefore, as the authentication device 210, a device that has been used so far may not be used, or a device that has not been used so far may be used.

A basic process example will be described.

In step S2802, when a first condition is satisfied, the image processing apparatus 2800 acquires the latest authentication device information (the authentication device list table 1300, specifically, the metadata 900) from the authentication device information management server 2850.

In step S2804, the image processing apparatus 2800 updates the use-permitted authentication device table 1400 in accordance with a second condition. An operation is performed by the administrator 255 as necessary. For example, the image processing apparatus 2800 displays new authentication device information to the administrator 255, and the administrator 255 sets the authentication device 210 permitted to be used by the image processing apparatus 2800 (the information processing apparatus 100 or the image processing apparatus 200 in the first exemplary embodiment, the image processing apparatus 1600 in the second exemplary embodiment, and the image processing apparatus 2200 in the third exemplary embodiment).

The image processing apparatus 2800 performs the following processing.

The authentication device information is acquired from the authentication device information management server 2850 in accordance with the first condition under which a process of updating the authentication device information in the authentication device information storage module (the authentication device information storage module 122, the authentication device information storage module 1522, and the authentication device information storage module 2322) is started.

Next, in accordance with the second condition under which the authentication device information in the authentication device information storage module is updated, the authentication device information in the authentication device information storage module is updated by using the authentication device information acquired from the authentication device information management server 2850.

Specifically, the first condition is an update process start condition of the use-permitted authentication device table 1400, and the second condition is an update condition of the use-permitted authentication device table 1400. The two conditions are determined in advance.

Here, as the first condition, any one of (1-1) starting an update process for every predetermined period, (1-2) starting an update process when an instruction is given by the administrator 255, and (1-3) starting an update process in accordance with an update date and time included in authentication device information acquired last time from the authentication device information management server 2850 is used.

The condition of (1-1) is so-called interval processing, and includes, for example, each X days, each Y months, and the like.

The condition of (1-2) is update processing based on a so-called manual instruction.

The condition of (1-3) is update processing using the next scheduled update date information 902 of the metadata 900. That is, after a date and time specified in the next scheduled update date information 902 of the metadata 900, acquisition of the metadata 900 is automatically performed.

As the second condition, any one of (2-1) updating the authentication device information in the authentication device information storage module in a case where the authentication device 210 that is valid in the authentication device information acquired last time from the authentication device information management server 2850 becomes invalid in the authentication device information newly acquired from the authentication device information management server 2850, and (2-2) updating the authentication device information in the authentication device information storage module in accordance with an operation of the administrator 255 in a case where the validity of the authentication device 210 included in the authentication device information newly acquired from the authentication device information management server 2850 is changed from that included in the authentication device information acquired last time from the authentication device information management server 2850 is used.

According to the condition (2-1), if the validity of the authentication device 210 becomes invalid, the authentication device 210 is automatically deleted from the use-permitted authentication device table 1400.

According to the condition of (2-2), if there is an update, the administrator 255 is notified to manually perform updating.

Figure 29:
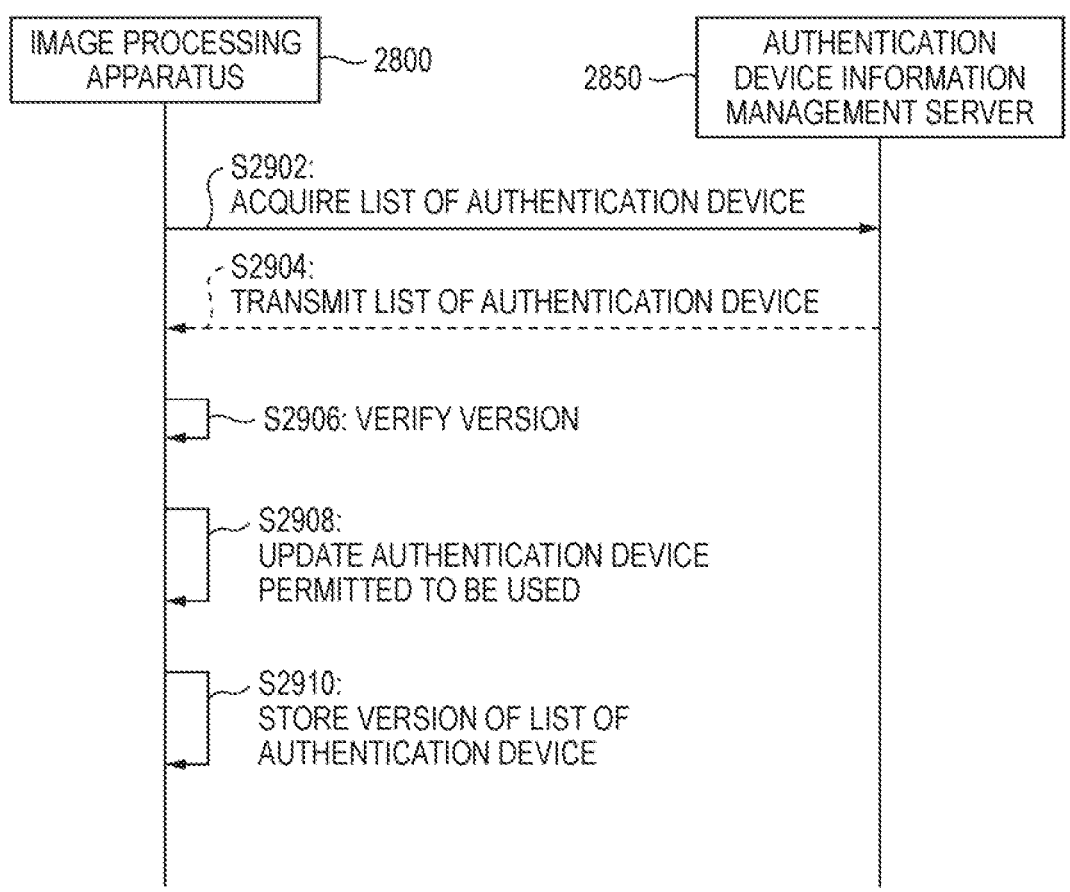
FIG. 29 is a flowchart illustrating a process example according to the fourth exemplary embodiment.

FIG. 29 is a flowchart illustrating a process example according to a fourth exemplary embodiment. This process is a process of automatically acquiring the metadata 900 (a list of authentication devices) and automatically updating the use-permitted authentication device table 1400 during an update process of the use-permitted authentication device table 1400. A process example in a case where the condition of (1-1) or the condition of (1-3) is used as the first condition and the condition of (2-1) is used as the second condition is illustrated.

In step S2902, the image processing apparatus 2800 acquires a list of authentication devices from the authentication device information management server 2850. That is, step S2902 is performed for each predetermined period or using next scheduled update date and time in a list of authentication devices acquired last time.

In step S2904, the authentication device information management server 2850 transmits the list of authentication devices to the image processing apparatus 2800.

In step S2906, the image processing apparatus 2800 performs version verification. That is, it is verified whether a version of the list of authentication devices acquired this time is newer than a version of the list of authentication devices acquired before. If newer, the process of step S2908 and subsequent steps are performed. If not newer (if the version is the same), the process of step S2908 and subsequent steps is not performed, and the process is ended.

In step S2908, the image processing apparatus 2800 updates the authentication device permitted to be used. That is, the use-permitted authentication device table 1400 is updated by using the acquired list of authentication devices.

In step S2910, the image processing apparatus 2800 stores the version of the list of authentication devices. In a process of a next time, the stored version becomes the "version of the list of authentication devices acquired before".

Figure 30:
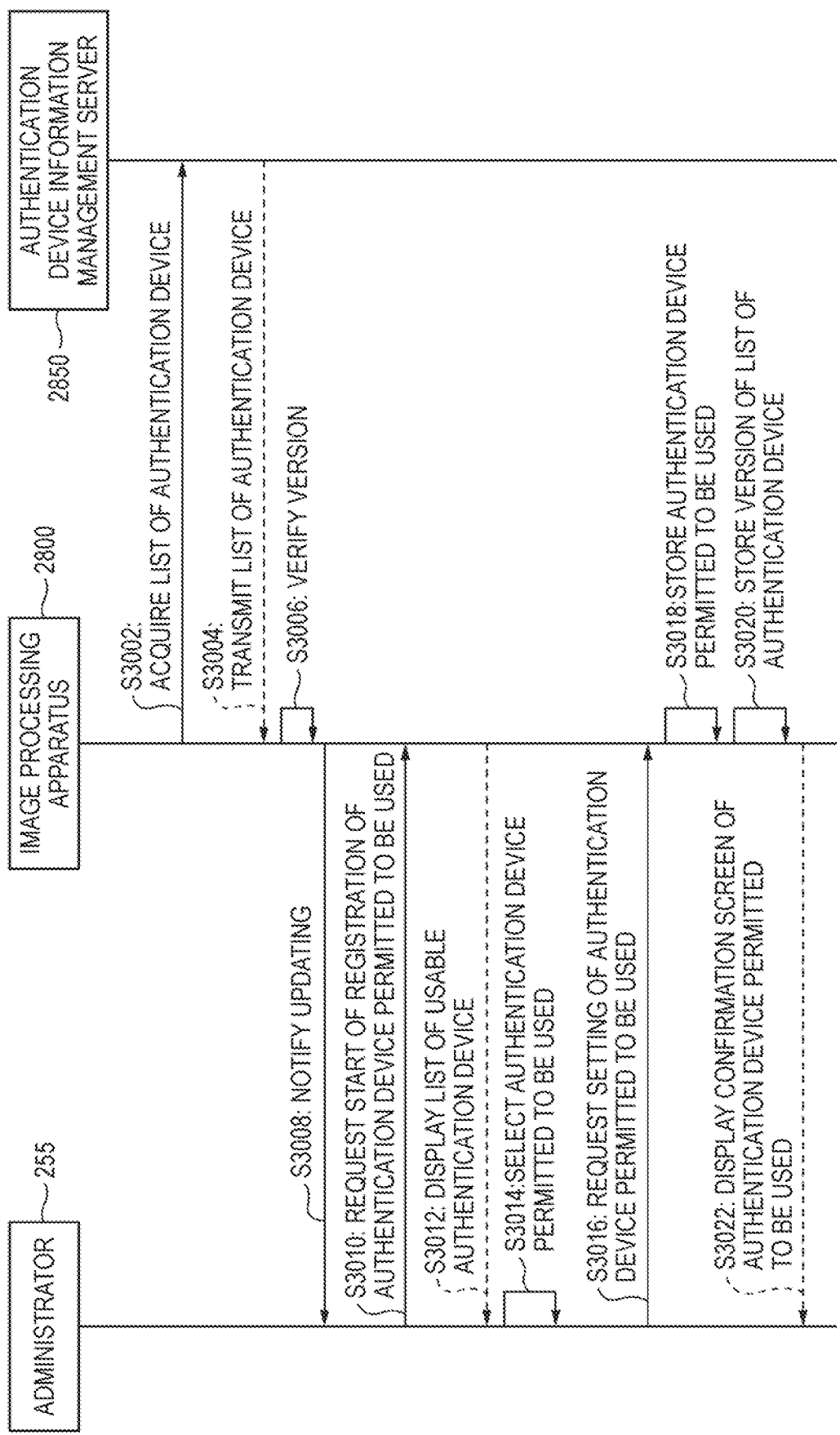
FIG. 30 is a flowchart illustrating a process example according to the fourth exemplary embodiment.

FIG. 30 is a flowchart illustrating the process example according to the fourth exemplary embodiment. This process is a process of automatically acquiring the metadata 900 (a list of authentication devices) and manually updating the use-permitted authentication device table 1400 during the update process of the use-permitted authentication device table 1400. A process example in a case where the condition of (1-1) or the condition of (1-3) is used as the first condition and the condition of (2-2) is used as the second condition is illustrated.

In step S3002, the image processing apparatus 2800 acquires a list of authentication devices from the authentication device information management server 2850. That is, step S3002 is performed for each predetermined period or using next scheduled update date and time in a list of authentication devices acquired last time.

In step S3004, the authentication device information management server 2850 transmits the list of authentication devices to the image processing apparatus 2800.

In step S3006, the image processing apparatus 2800 performs version verification. The same processing as the processing in step S2906 in the flowchart illustrated in the example of FIG. 29 is performed.

In step S3008, the image processing apparatus 2800 notifies the administrator 255 of updating of usable authentication devices.

In step S3010, the administrator 255 requests the image processing apparatus 2800 to start registration of an authentication device permitted to be used.

In step S3012, the image processing apparatus 2800 displays a list of usable authentication devices to the administrator 255.

In step S3014, the administrator 255 selects an authentication device permitted to be used.

In step S3016, the administrator 255 requests the image processing apparatus 2800 to set the authentication device permitted to be used.

In step S3018, the image processing apparatus 2800 stores the authentication device permitted to be used.

In step S3020, the image processing apparatus 2800 stores the version of the list of authentication devices. In a process of a next time, the stored version becomes the "version of the list of authentication devices acquired before".

In step S3022, the image processing apparatus 2800 displays, to the administrator 255, a confirmation screen of the authentication device permitted to be used.

Figure 31:
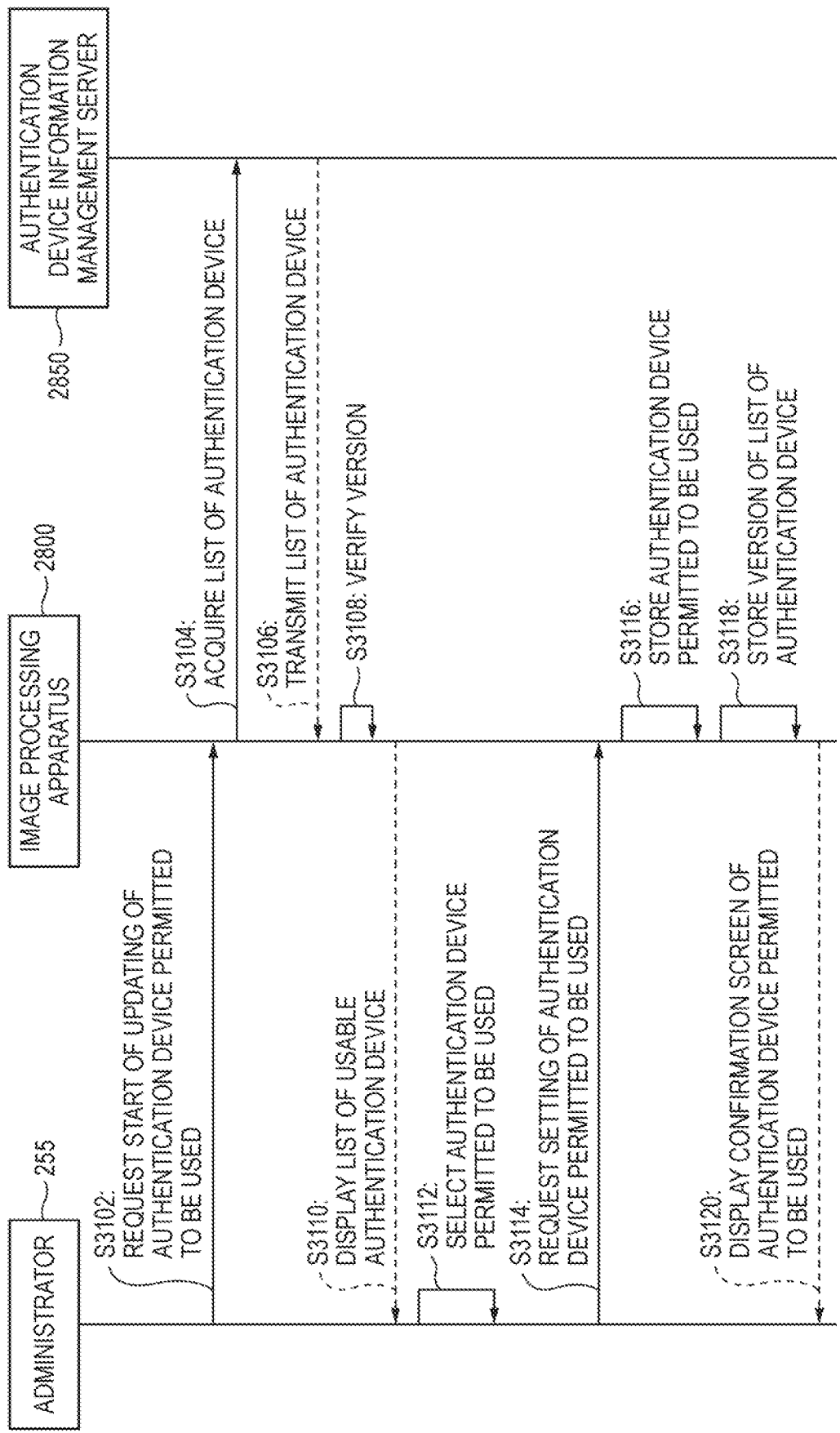
FIG. 31 is a flowchart illustrating a process example according to the fourth exemplary embodiment.

FIG. 31 is a flowchart illustrating the process example according to the fourth exemplary embodiment. This process is a process of manually acquiring the metadata 900 (a list of authentication devices) and manually updating the use-permitted authentication device table 1400 during the update process of the use-permitted authentication device table 1400. A process example in a case where the condition of (1-2) is used as the first condition and the condition of (2-2) is used as the second condition is illustrated.

In step S3102, the administrator 255 requests the image processing apparatus 2800 to start updating of an authentication device permitted to be used.

In step S3104, the image processing apparatus 2800 acquires a list of authentication devices from the authentication device information management server 2850.

In step S3106, the authentication device information management server 2850 transmits the list of authentication devices to the image processing apparatus 2800.

In step S3108, the image processing apparatus 2800 performs version verification. The same processing as the processing in step S2906 in the flowchart illustrated in the example of FIG. 29 is performed.

In step S3110, the image processing apparatus 2800 displays a list of usable authentication devices to the administrator 255.

In step S3112, the administrator 255 selects an authentication device permitted to be used.

In step S3114, the administrator 255 requests the image processing apparatus 2800 to set the authentication device permitted to be used.

In step S3116, the image processing apparatus 2800 stores the authentication device permitted to be used.

In step S3118, the image processing apparatus 2800 stores the version of the list of authentication devices. In a process of a next time, the stored version becomes the "version of the list of authentication devices acquired before".

In step S3120, the image processing apparatus 2800 displays, to the administrator 255, a confirmation screen of the authentication device permitted to be used.

Figure 32:
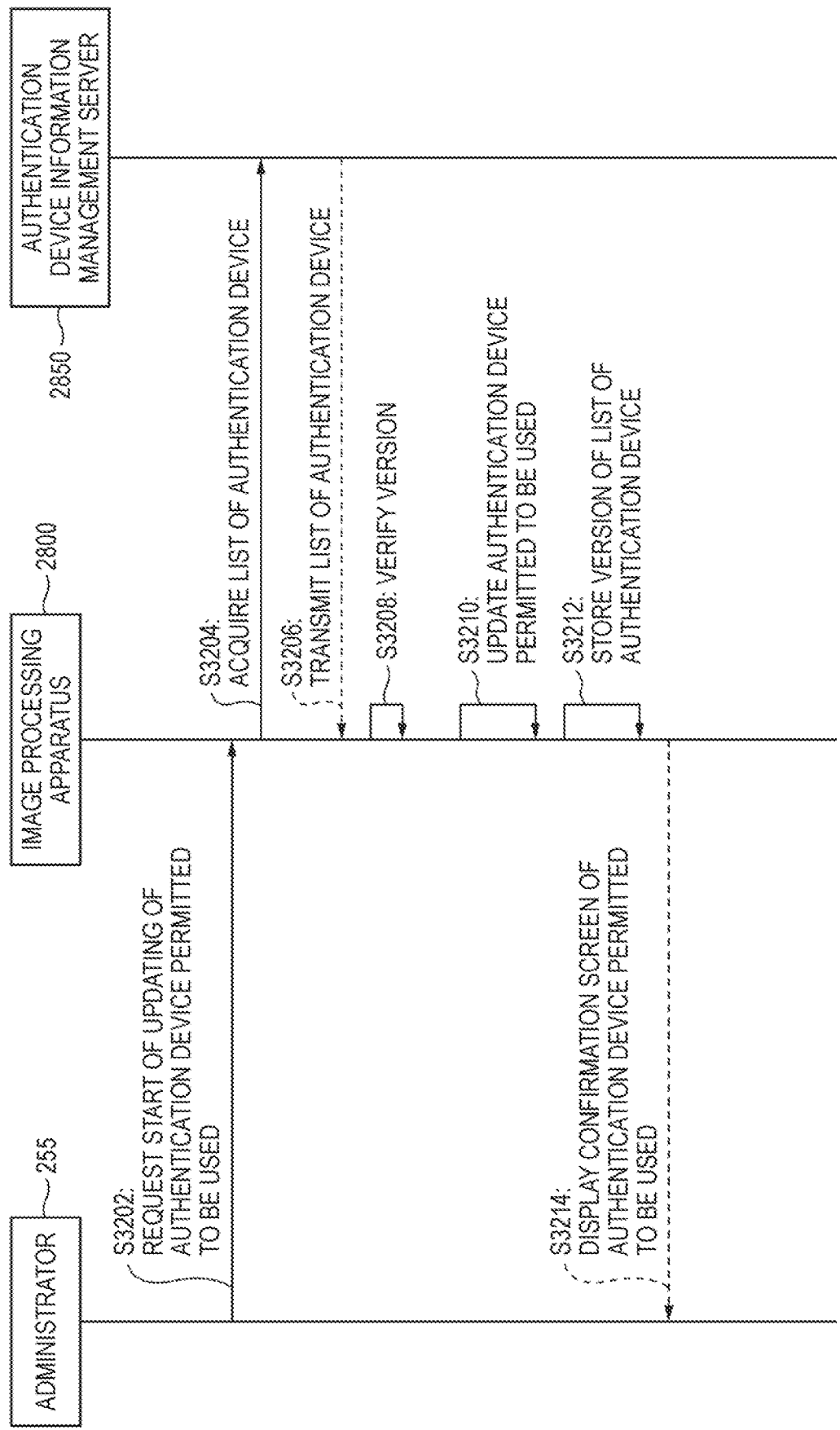
FIG. 32 is a flowchart illustrating a process example according to the fourth exemplary embodiment.

FIG. 32 is a flowchart illustrating the process example according to the fourth exemplary embodiment. This process is a process of manually acquiring the metadata 900 (a list of authentication devices) and automatically updating the use-permitted authentication device table 1400 during the update process of the use-permitted authentication device table 1400. A process example in a case where the condition of (1-2) is used as the first condition and the condition of (2-1) is used as the second condition is illustrated.

In step S3202, the administrator 255 requests the image processing apparatus 2800 to start updating of an authentication device permitted to be used.

In step S3204, the image processing apparatus 2800 acquires a list of authentication devices from the authentication device information management server 2850.

In step S3206, the authentication device information management server 2850 transmits the list of authentication devices to the image processing apparatus 2800.

In step S3208, the image processing apparatus 2800 performs version verification. The same processing as the processing in step S2906 in the flowchart illustrated in the example of FIG. 29 is performed.

In step S3210, the image processing apparatus 2800 updates the authentication device permitted to be used.

In step S3212, the image processing apparatus 2800 stores the version of the list of authentication devices. In a process of a next time, the stored version becomes the "version of the list of authentication devices acquired before".

In step S3214, the image processing apparatus 2800 displays, to the administrator 255, a confirmation screen of the authentication device permitted to be used.

Figure 33:
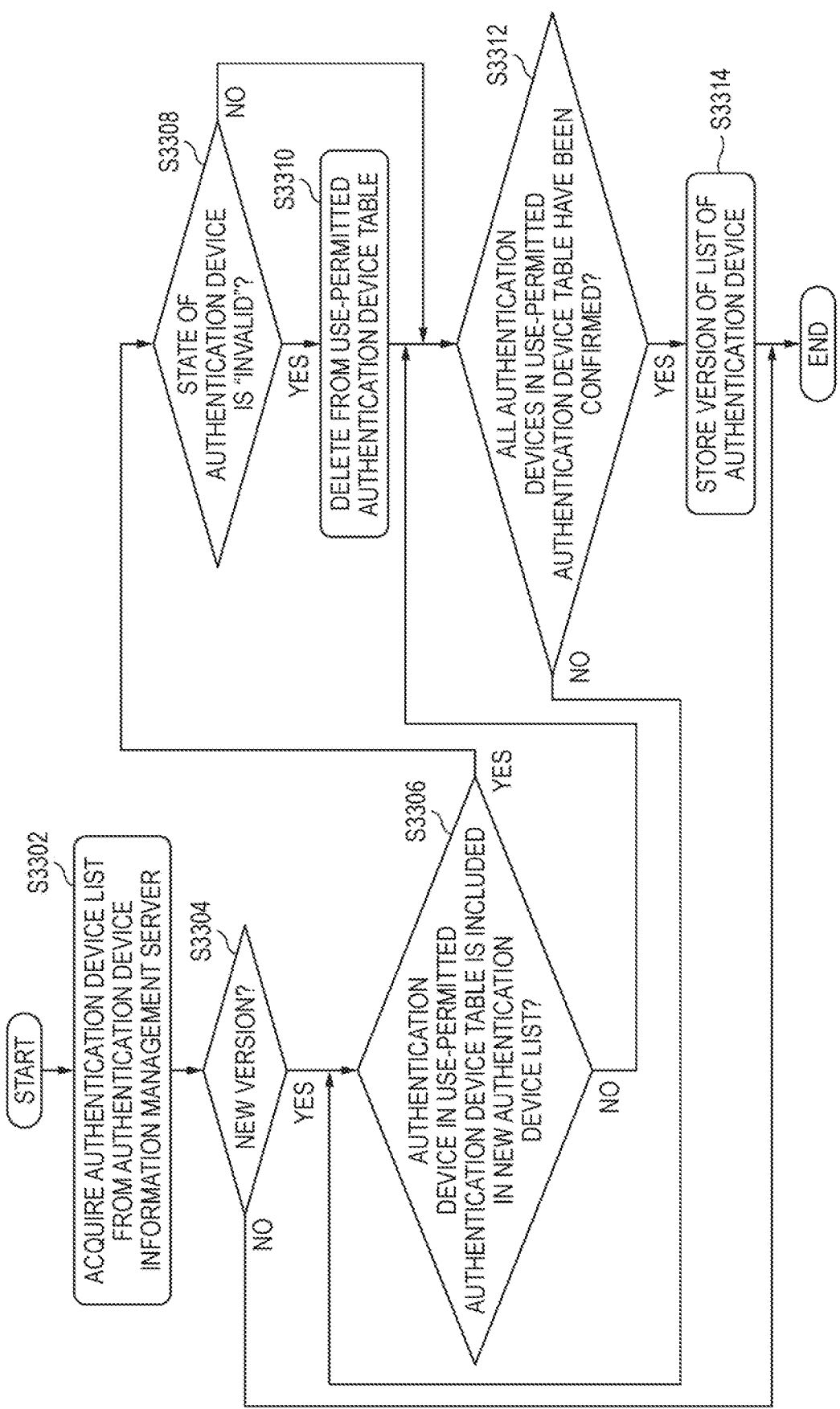
FIG. 33 is a flowchart illustrating a process example according to the fourth exemplary embodiment.

FIG. 33 is a flowchart illustrating the process example according to the fourth exemplary embodiment (image processing apparatus 2800). This process is a process of automatically updating the use-permitted authentication device table 1400 during the update process of the use-permitted authentication device table 1400. A process example in a case where the condition of (2-1) is used as the second condition is illustrated.

In step S3302, an authentication device list (authentication device list table 3410) is acquired from the authentication device information management server 2850. The first condition applied to such acquisition may be any one of the condition of (1-1), the condition of (1-2), and the condition of (1-3).

In step S3304, it is determined whether a version of the authentication device list acquired this time is a newer version than a version of an authentication device list acquired last time. If the version is newer, the process proceeds to step S3306. Otherwise, the process is ended.

In step S3306, it is determined whether an authentication device of a use-permitted authentication device table (use-permitted authentication device table 3400) is included in the new authentication device list. If included, the process proceeds to step S3308. Otherwise, the process proceeds to step S3312.

In step S3308, it is determined whether a state of the authentication device is "invalid". If being "invalid", the process proceeds to step S3310. Otherwise, the process proceeds to step S3312.

In step S3310, the invalid authentication device is deleted from the use-permitted authentication device table.

In step S3312, it is determined whether all authentication devices in the use-permitted authentication device table have been confirmed (determined in step S3306). If all have been confirmed, the process proceeds to step S3314. Otherwise, the process returns to step S3306.

In step S3314, the version of the authentication device list acquired in step S3302 is stored.

FIGS. 34A, 34B, and 34C show explanatory diagrams illustrating an example of data structures of the use-permitted authentication device table 3400 and the authentication device list table 3410. A specific example according to the process of FIG. 33 is illustrated. That is, when the use-permitted authentication device table 3400 is automatically updated and the authentication device list table 3410 acquired from the authentication device information management server 2850 is updated, if an authentication device described in the current use-permitted authentication device table 3400 is invalid, the authentication device is automatically deleted from the use-permitted authentication device table 3400. Further, the administrator 255 may be notified of such a fact by mail or the like.

FIG. 34A shows an explanatory diagram illustrating an example of a data structure of a use-permitted authentication device table 3400a. The use-permitted authentication device table 3400a is the use-permitted authentication device table 3400 in a state before updating.

The use-permitted authentication device table 3400a includes an authentication device identifier column 3402a. The authentication device identifier column 3402a stores an authentication device identifier.

The use-permitted authentication device table 3400a indicates that authentication devices permitted to be used have authentication device identifiers "AUTH_a", "AUTH_c", and "AUTH_d".

FIG. 34B shows an explanatory diagram illustrating an example of a data structure of the authentication device list table 3410. The authentication device list table 3410 is an authentication device list acquired by the image processing apparatus 2800 from the authentication device information management server 2850.

The authentication device list table 3410 includes an authentication device identifier column 3412 and a validity column 3414. The authentication device identifier column 3412 stores an authentication device identifier. The validity column 3414 stores validity.

For example, in the authentication device list table 3410, a first line indicates that an authentication device identifier AUTH_a is valid, a second line indicates that an authentication device identifier AUTH_b is invalid, a third line indicates that an authentication device identifier AUTH_c is valid, a fourth line indicates that an authentication device identifier AUTH_d is invalid, a fifth line indicates that an authentication device identifier AUTH_e is valid, and a sixth line indicates that an authentication device identifier AUTH_f is invalid.

FIG. 34C shows an explanatory diagram illustrating an example of a data structure of a use-permitted authentication device table 3400c. The use-permitted authentication device table 3400c is a state after the use-permitted authentication device table 3400a is updated by the authentication device list table 3410.

The use-permitted authentication device table 3400c includes an authentication device identifier column 3402c. The authentication device identifier column 3402c stores an authentication device identifier.

The use-permitted authentication device table 3400a indicates that authentication devices permitted to be used have authentication device identifiers "AUTH_a" and "AUTH_c". That is, "AUTH_d" that is permitted to be used in the use-permitted authentication device table 3400a before the update is deleted. This is because AUTH_d is changed to be invalid in the authentication device list table 3410.

In the exemplary embodiments above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration that are located physically apart from each other but may work cooperatively. The order of operations of the processor is not limited to one described in the present exemplary embodiments above, and may be changed as appropriate.

The program described above may be provided by being stored in a recording medium, or may be provided by a communication unit. In this case, for example, the above-described program may be regarded as an invention of a "computer-readable recording medium storing a program".

The "computer-readable recording medium storing a program" refers to a computer-readable recording medium in which a program is recorded, which is used for program installation, execution, program distribution, or the like.

The recording medium includes, for example, a digital versatile disc (DVD) such as DVD-R, DVD-RW, DVD-RAM, or the like that is a standard established by the DVD Forum, DVD+R, DVD+RW, or the like that is a standard established by DVD+RW, a compact disk (CD) including read-only memory (CD-ROM), CD recordable (CD-R), CD rewritable (CD-RW), or the like, and a Blu-ray (registered trademark) disc, a magneto-optical disk (MO), a flexible disk (FD), a magnetic tape, a hard disk, a read-only memory (ROM), an electrically erasable programmable read-only memory (EEPROM (registered trademark)), a flash memory, a random access memory (RAM), a secure digital (SD) memory card, or the like.

The whole or a part of the program may be recorded in the recording medium and stored, distributed, or the like. In addition, the program may be transmitted by communication, for example, by using a transmission medium such as a wired network or a wireless communication network used for a local area network (LAN), a metropolitan area network (MAN), a wide area network (WAN), the Internet, an intranet, extranet, or the like, or a combination thereof, or may be carried on a carrier wave.

Further, the program may be a part or the whole of another program, or may be recorded on a recording medium together with a separate program. In addition, the program may be divided and recorded on plural recording media. In addition, the program may be recorded in any mode as long as the program is restorable by compression, encryption, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, configured to function as a Fast IDentity Online (FIDO) client, comprising:
 a memory configured to store authentication device information indicating at least one authentication device usable in FIDO authentication using the information processing apparatus; and
 a processor configured to
  acquire the authentication device information from an authentication device information management server to present the authentication device information to an administrator,
  cause the memory to store an authentication device list table including an authentication device identifier and a validity for each authentication device identifier as the authentication device information indicating a selected authentication device that is selected by the administrator as being connectable to the information processing apparatus, and, in response to an authentication start request from a user for FIDO authentication, in a case where a first authentication device used by the user is not included in the at least one authentication device indicated by the authentication device information stored in the memory, restrict use of the first authentication device used by the user, where in the processor is configured to determine whether the first authentication device used by the user is included in the at least one authentication device indicated by the authentication device information stored in the memory after an assertion is acquired from the first authentication device, the assertion being generated by the first authentication device based on a parameter received from a Relying Party (RP) server, wherein in a case where the first authentication device used by the user is included in the at least one authentication device indicated by the authentication device information stored in the memory, the processor is configured to transmit the assertion acquired from the first authentication device to the Relying Party (RP) server.

2. The information processing apparatus according to claim 1, wherein, in a case where the first authentication device used by the user is included in the at least one authentication device indicated by the authentication device information stored in the memory, the processor is configured to permit the use of the first authentication device.

3. The information processing apparatus according to claim 1, wherein, in a case where the first authentication device used by the user is not included in the at least one authentication device indicated by the authentication device information stored in the memory, the processor is configured to transmit information indicating that assertion generation has failed to the Relying Party (RP) server.

4. The information processing apparatus according to claim 1, wherein the processor is configured to acquire the authentication device information from the authentication device information management server in accordance with a first condition under which an update process is started, and update the authentication device information in the memory by using the authentication device information acquired from the authentication device information management server in accordance with a second condition under which the authentication device information in the memory is updated.

5. The information processing apparatus according to claim 4, wherein the first condition is
  (i) starting the update process in every predetermined period,
  (ii) starting the update process in response to an instruction by the administrator, or
  (iii) starting the update process in accordance with an update date and time included in the authentication device information acquired last time from the authentication device information management server.

6. The information processing apparatus according to claim 4, wherein the second condition is
  (i) updating the authentication device information in the memory in a case where an authentication device that is valid in the authentication device information acquired last time from the authentication device information management server becomes invalid in the authentication device information newly acquired from the authentication device information management server, or
  (ii) updating the authentication device information in the memory in accordance with an operation of the administrator in a case where a validity of the authentication device included in the authentication device information newly acquired from the authentication device information management server is changed from the validity of the authentication device included in the authentication device information acquired last time from the authentication device information management server.

7. The information processing apparatus according to claim 5, wherein the second condition is
  (i) updating the authentication device information in the memory in a case where an authentication device that is valid in the authentication device information acquired last time from the authentication device information management server becomes invalid in the authentication device information newly acquired from the authentication device information management server, or
  (ii) updating the authentication device information in the memory in accordance with an operation of the administrator in a case where a validity of the authentication device included in the authentication device information newly acquired from the authentication device information management server is changed from the validity of the authentication device included in the authentication device information acquired last time from the authentication device information management server.

8. A method of functioning as a Fast IDentity Online (FIDO) client, comprising:

acquiring authentication device information from an authentication device information management server to present the authentication device information to an administrator, the authentication device information indicating at least one authentication device usable in FIDO authentication;

storing an authentication device list table including an authentication device identifier and a validity for each authentication device identifier as the authentication device information indicating a selected authentication device that is selected by the administrator as being connectable in the FIDO authentication; and, in response to an authentication start request from a user for FIDO authentication, in a case where a first authentication device used by the user is not included in the at least one authentication device indicated by the stored authentication device information, restricting use of the first authentication device used by the user, wherein the method determines whether the first authentication device used by the user is included in the at least one authentication device indicated by the stored authentication device information after an assertion is acquired from the first authentication device, the assertion being generated by the first authentication device based on a parameter received from a Relying Party (RP) server, wherein in a case where the first authentication device used by the user is included in the at least one authentication device indicated by the stored authentication device information, transmitting the assertion generated by the first authentication device to the RP server.

9. A non-transitory computer readable medium storing a program causing a computer to execute a process for information processing, the computer including a memory configured to store authentication device information indicating at least one authentication device usable in Fast IDentity Online (FIDO) authentication using the computer, and a processor, the process comprising:

acquiring the authentication device information from an authentication device information management server to present the authentication device information to an administrator;

causing the memory to store an authentication device list table including an authentication device identifier and a validity for each authentication device identifier as the authentication device information indicating a selected authentication device that is selected by the administrator as being connectable to the computer; and, in response to an authentication start request from a user for FIDO authentication, in a case where a first authentication device used by the user is not included in the at least one authentication device indicated by the authentication device information stored in the memory, restricting use of the first authentication device, wherein the process determines whether the first authentication device used by the user is included in the at least one authentication device indicated by the authentication device information stored in the memory after an assertion is acquired from the first authentication device, the assertion being generated by the first authentication device based on a parameter received from a Relying Party (RP) server, wherein in a case where the first authentication device used by the user is included in the at least one authentication device indicated by the authentication device information, transmitting the assertion generated by the first authentication device to the RP server.

* * * * *